United States Patent
Takatori

(10) Patent No.: US 9,383,499 B2
(45) Date of Patent: Jul. 5, 2016

(54) SURFACE LIGHT SOURCE DEVICE AND DISPLAY DEVICE

(71) Applicant: Enplas Corporation, Saitama (JP)

(72) Inventor: Hiroshi Takatori, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/419,740

(22) PCT Filed: Jun. 11, 2013

(86) PCT No.: PCT/JP2013/003653
§ 371 (c)(1),
(2) Date: Feb. 5, 2015

(87) PCT Pub. No.: WO2014/024374
PCT Pub. Date: Feb. 13, 2014

(65) Prior Publication Data
US 2015/0219823 A1 Aug. 6, 2015

(30) Foreign Application Priority Data

Aug. 7, 2012 (JP) ................................. 2012-175008
Feb. 27, 2013 (JP) ................................. 2013-037144

(51) Int. Cl.
*F21V 8/00* (2006.01)
*G02B 19/00* (2006.01)
*G02F 1/1335* (2006.01)

(52) U.S. Cl.
CPC ............ *G02B 6/0031* (2013.01); *G02B 6/0051* (2013.01); *G02B 6/0068* (2013.01);
(Continued)

(58) Field of Classification Search
CPC .. G02B 6/0031; G02B 6/0068; G02B 6/0051; G02B 6/0096; G02B 6/0046; G02B 6/003; G02B 6/0073; G02B 6/0055
See application file for complete search history.

(56) References Cited

U.S. PATENT DOCUMENTS

2004/0114342 A1* 6/2004 Lin ...................... G02B 6/0068
362/628
2007/0171676 A1 7/2007 Chang
(Continued)

FOREIGN PATENT DOCUMENTS

JP 2009-099271 A 5/2009
WO 2009/125618 A1 10/2009

OTHER PUBLICATIONS

International Search Report from International Application No. PCT/JP2013/003653 mailed Jul. 9, 2013.
(Continued)

*Primary Examiner* — Dennis Y Kim
(74) *Attorney, Agent, or Firm* — Brundidge & Stanger, P.C.

(57) ABSTRACT

This surface light source device has; a case; multiple light-emitting devices arranged on the inner surfaces of a pair of side walls within the case; a reflecting member that protrudes from the base surface of the case, and that reflects light emitted from the light-emitting devices toward an aperture part of the case; and a light-emitting surface member that has a light-diffusing property and a light-transmitting property, and that covers the aperture part. The light-emitting devices are arranged on the side walls such that the light axis of the light-emitting elements is parallel to the base surface of the case. The light-reflecting member has a ridge line that is parallel to the side surfaces and the ceiling surface of the case, and the light-reflecting member is formed with a curved surface, with the ridge line being contained in the apex thereof.

16 Claims, 24 Drawing Sheets

(52) U.S. Cl.
CPC .......... *G02B6/0096* (2013.01); *G02B 19/0028* (2013.01); *G02B 19/0047* (2013.01); *G02F 1/133615* (2013.01); *G02B 6/003* (2013.01); *G02B 6/0046* (2013.01); *G02B 6/0055* (2013.01); *G02F 2201/34* (2013.01); *G02F 2203/03* (2013.01)

(56) References Cited

U.S. PATENT DOCUMENTS

| | | |
|---|---|---|
| 2009/0103009 A1 | 4/2009 | Ohmi et al. |
| 2010/0208490 A1 | 8/2010 | Tsuchiya et al. |
| 2011/0007506 A1 | 1/2011 | Kinoshita |
| 2012/0013527 A1 | 1/2012 | Cao et al. |

OTHER PUBLICATIONS

Extended European Search Report for EP 13827340.4 dated Mar. 23, 2016.

* cited by examiner

SURFACE LIGHT SOURCE DEVICE AND DISPLAY DEVICE

TECHNICAL FIELD

The present invention relates to a surface light source device and a display apparatus.

BACKGROUND ART

Recently, a light-emitting diode (hereinafter, referred to as "LED") has been increasingly used as a light source for a surface light source device (illumination apparatus) of an edge-lit type with a hollow structure without using a light guide plate. In such a surface light source device, there is a case where a combination of an LED and a light flux controlling member (lens) may be used in order to control the distribution of light emitted from an LED (see PTL 1, for example).

FIG. 1 is a sectional view illustrating the configuration of surface light source device 10 set forth in PTL 1. As illustrated in FIG. 1, surface light source device 10 has hollow unit case 11, LED light source units 12 disposed linearly on two side surfaces facing each other inside unit case 11, condenser lens 13 that controls the distribution of light emitted from LED light source unit 12, reflection member 14 disposed at the side of a bottom surface inside unit case 11, and light-emitting planar member 15 disposed at the side of a top surface inside unit case 11. Reflection member 14 has inclined surfaces that incline from a ridge line positioned at the center between the side surfaces facing each other of unit case 11 toward the side surfaces.

The distribution of light emitted from LED light source unit 12 is controlled by condenser lens 13. Light emitted from condenser lens 13 is diffused and reflected at reflection member 14, and then transmitted through light-emitting planar member 15 to be emitted toward the outside. In surface light source device 10 set forth in PTL 1, surface roughness Ra of reflection member 14 is set to be greater than 1 μm, thereby achieving equalization of the luminance distribution in the light emitting area.

CITATION LIST

Patent Literature

PTL 1
Japanese Patent Application Laid-Open No. 2009-99271

SUMMARY OF INVENTION

Technical Problem

In the surface light source device set forth in PTL 1, there is a problem in which, since the shape of the reflection member is not optimized, the linear area with high luminance (bright line) is easily formed at the central portion of the light emitting area.

An object of the present invention is to provide a surface light source device capable of preventing the formation of a bright line at the central portion of the light emitting area. Further, another object of the present invention is to provide a display apparatus having the surface light source device.

Solution to Problem

The surface light source device of the present invention has a cavity surrounded by a bottom surface, side surfaces and a top surface, with a light emitting area being formed on the top surface, and a plurality of light emitting devices, each having a light emitting element and a light flux controlling member that controls a distribution of light emitted from the light emitting element, the plurality of light emitting devices being arranged on a pair of side surfaces facing each other inside the cavity such that an optical axis of the light emitting element extends from one of the pair of side surfaces to the other, a reflection member that forms a part or all of the bottom surface, and a light-emitting planar member that has a light diffusing property and optical transparency and forms the light emitting area, wherein the reflection member is protruded toward an inside of the cavity such that light emitted from the light emitting device is reflected toward the light emitting area, and has a ridge line that is parallel to the pair of side surfaces and the top surface, with an apex being formed with a curved surface including the ridge line, when an emission angle, increasing from the optical axis to the light-emitting planar member side, relative to the optical axis of a light beam emitted from the light emitting device is set as θ, a distance between a position where a light beam having been emitted from the light emitting device at emission angle θ and having been specularly reflected once at the reflection member reached the light-emitting planar member and an end part closest to the light emitting device, of the light emitting area in the light-emitting planar member, is set as L1, and an emission angle of a light beam, being emitted from the light emitting device to be tangential to the reflection member, relative to the optical axis is set as θ1, ΔL1/Δθ is gradually decreased in association with a decrease in the θ within a certain range whose upper limit is θ1, and when a distance between a position where a light beam having been emitted from the light emitting device at emission angle θ and having been specularly reflected once at each of the light-emitting planar member and the reflection member reached the light-emitting planar member again and an end part closest to the light emitting device, of the light emitting area in the light-emitting planar member, is set as L2, and an emission angle of a light beam, being emitted from the light emitting device to be reflected at the light-emitting planar member before reaching a ridge line of the reflection member, relative to the optical axis is set as θ2, ΔL2/Δθ is gradually increased together with a decrease in L2 in association with an increase in the θ within a certain range including the θ2.

The display apparatus of the present invention has a surface light source device of the present invention, and a display member to be irradiated with light emitted from the light-emitting planar member of the surface light source device.

Advantageous Effects of Invention

The surface light source device of the present invention is capable of irradiating a light-emitting planar member with light uniformly, and thus is capable of preventing the formation of a bright line at the central portion of the light emitting area. Further, it is possible to reduce luminance unevenness compared to a conventional surface light source device.

DESCRIPTION OF EMBODIMENTS

In the following, embodiments of the surface light source device of the present invention will be described in detail with reference to the accompanying drawings. The surface light source device of the present invention may be used as a display apparatus by combining it with a display member such as a liquid crystal panel.

[Configuration of Surface Light Source Device]

Figure 1:
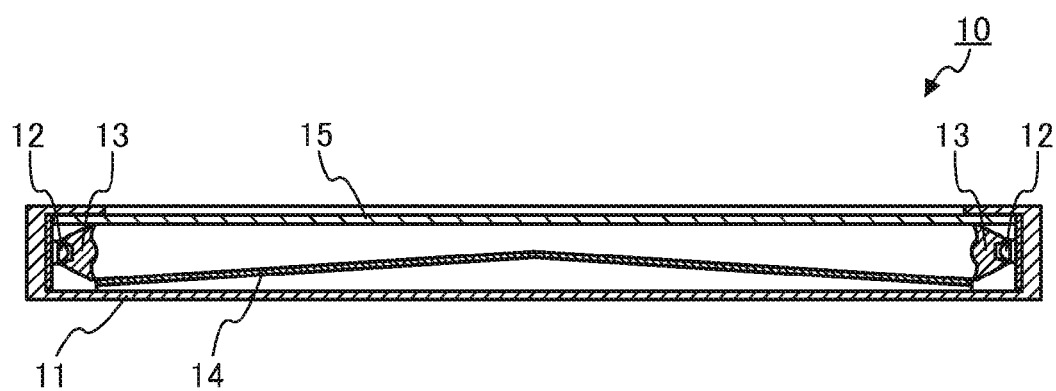
FIG. 1 is a sectional view illustrating the configuration of a surface light source device set forth in PTL 1.
Figure 2A:
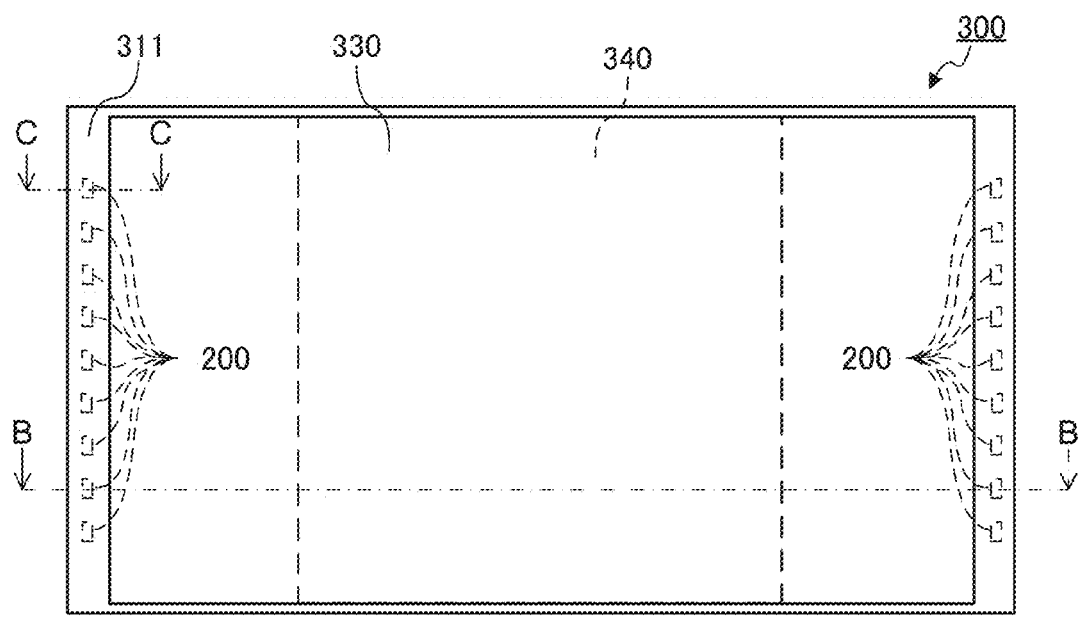
FIG. 2A is a plan view of a surface light source device of an embodiment in the present invention.
Figure 2B:
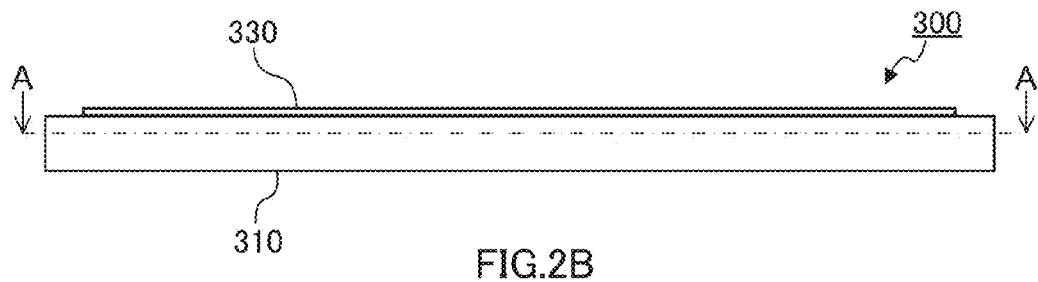
FIG. 2B is a front view of the surface light source device.
Figure 3A:
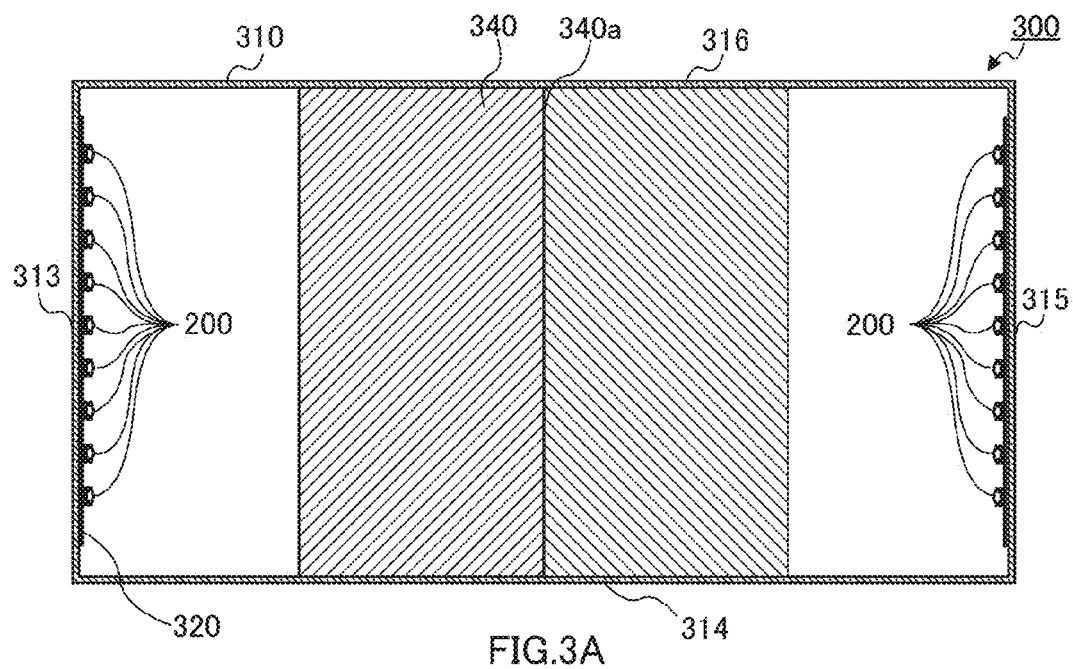
FIG. 3A is a sectional view taken along line A-A illustrated in FIG. 2B.
Figure 3B:
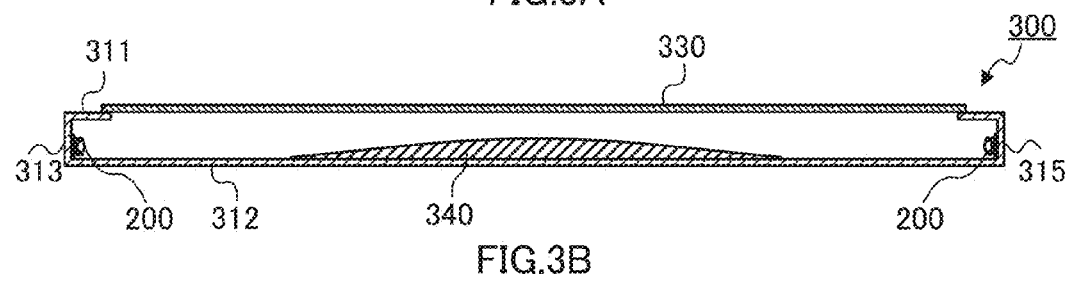
FIG. 3B is a sectional view taken along line B-B illustrated in FIG. 2A.
Figure 3C:
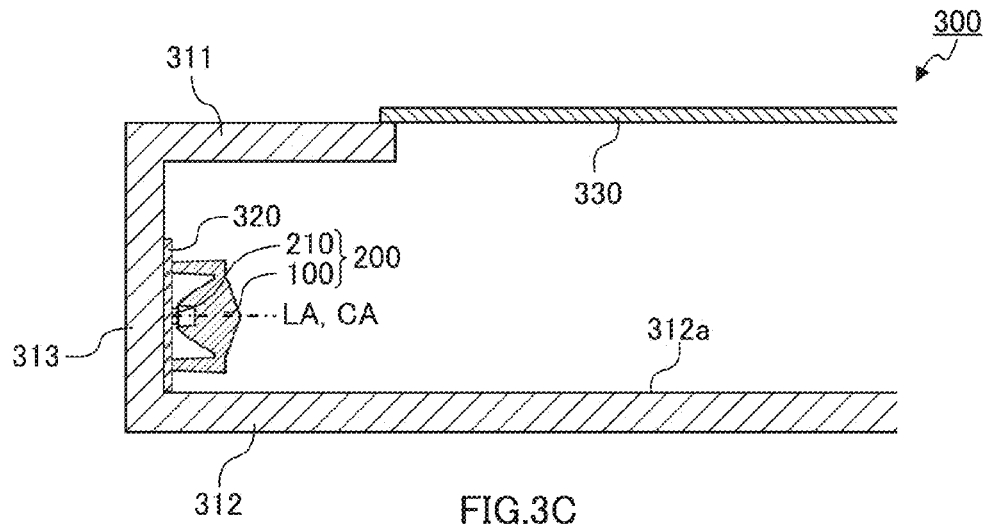
FIG. 3C is a partially enlarged sectional view taken along line C-C illustrated in FIG. 2A.

FIGS. 2A and 2B and 3A to 3C are drawings illustrating the configuration of surface light source device 300 according to an embodiment of the present invention. FIG. 2A is a plan view of surface light source device 300, and FIG. 2B is a front view of surface light source device 300. FIG. 3A is a sectional view taken along line A-A illustrated in FIG. 2B, FIG. 3B is a sectional view taken along line B-B illustrated in FIG. 2A, and FIG. 3C is a partially enlarged sectional view taken along line C-C illustrated in FIG. 2A.

As illustrated in FIGS. 2A and 2B and 3A to 3C, surface light source device 300 has casing 310, two substrates 320, a plurality of light emitting devices 200, light-emitting planar member 330 and reflection member 340.

Casing 310 is a cuboid-shaped box for casing therein substrate 320, a plurality of light emitting devices 200, and reflection member 340. Casing 310 is composed of top plate 311, bottom plate 312 facing top plate 311, and four sidewalls 313 to 316 that link top plate 311 and bottom plate 312. In the following description, a virtual surface that links edge sides, at bottom surface 312 side, of a pair of side surfaces 313 and 315 facing each other is referred to as "base surface," and the internal surface of sidewalls 313 to 316 is referred to as "side surface." At top plate 311, there is formed a rectangle-shaped opening that constitutes a light emitting area (see FIGS. 3B and 3C). The opening is covered with light-emitting planar member 330 (see FIGS. 3B and 3C). Accordingly, the internal surface of top plate 311 and light-emitting planar member 330 is referred to as "top surface." The size of the opening is of the same size as a light emitting area formed on light-emitting planar member 330, and is for example 400 mm×700 mm. The height (spatial thickness) from the base surface to the internal surface of light-emitting planar member 330 that covers the opening is for example 35 mm. Further, in the present embodiments, the "base surface" is identical to the internal surface of bottom plate 312. In addition, the base surface functions as diffusion and reflection surface 312a that diffuses and reflects light emitted from light emitting device 200 toward light-emitting planar member 330. Casing 310 is composed for example of a resin such as polymethylmethacrylate (PMMA) or polycarbonate (PC), or a metal such as stainless steel or aluminum.

Two substrates 320 are rectangular flat plates for disposing thereon a plurality of (e.g., nine per substrate 320) light emitting devices 200 at set intervals. Two substrates 320 are respectively fixed to two sidewalls 313 and 315 facing each other. On substrate 320, there are formed a plurality of through-holes or recesses for positioning light emitting devices 200 (light flux controlling member 100).

A plurality of light emitting devices 200 each have light emitting element 210 and light flux controlling member 100 (see FIG. 3C), and are aligned on each of two substrates 320 at set intervals (e.g., 90 mm). Further, a plurality of light emitting devices 200 are disposed such that optical axis LA of each light emitting element 210 is parallel to the base surface. For example, each light emitting device 200 is disposed such that the height of optical axis LA from the base surface is 10 mm.

Light emitting element 210 is a light source of surface light source device 300 (and light emitting device 200), and is fixed on substrate 320. Light emitting element 210 is for example a light-emitting diode (LED) such as a white light-emitting diode.

Light flux controlling member 100 controls the distribution of light emitted from light emitting element 210. Light flux controlling member 100 is disposed over light emitting element 210 such that its central axis CA coincides with optical axis LA of light emitting element 210. Here, the "optical axis of light emitting element" means the central light beam of a stereoscopic emission light flux from light emitting element 210.

Light flux controlling member 100 is formed by integral molding. The material for light flux controlling member 100 is not particularly limited as long as the light of a desired wavelength can pass through the material. Examples of the material for light flux controlling member 100 include: light-transmissive resins such as polymethylmethacrylate (PMMA), polycarbonate (PC), and epoxy resin (EP); and glass.

Figure 4A:
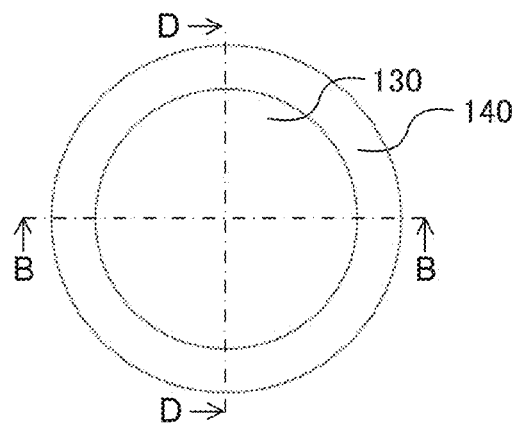
FIG. 4A is a plan view of a light flux controlling member of an embodiment.
Figure 4B:
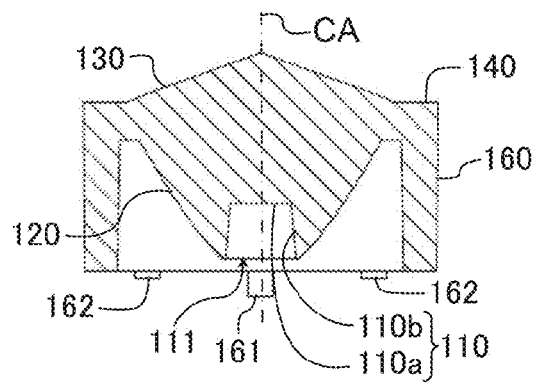
FIG. 4B is a sectional view illustrated along line B-B in FIG. 4A.
Figure 4C:
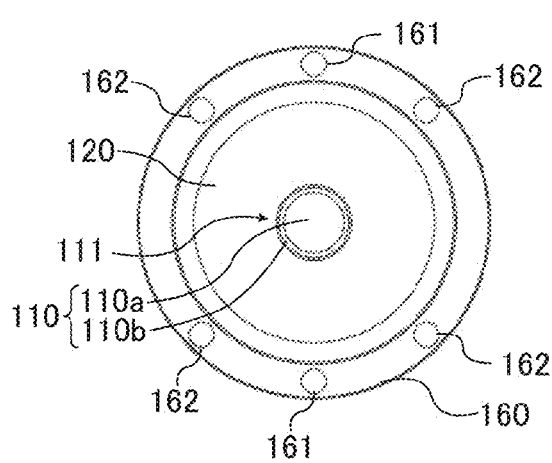
FIG. 4C is a bottom view of the light flux controlling member.
Figure 4D:
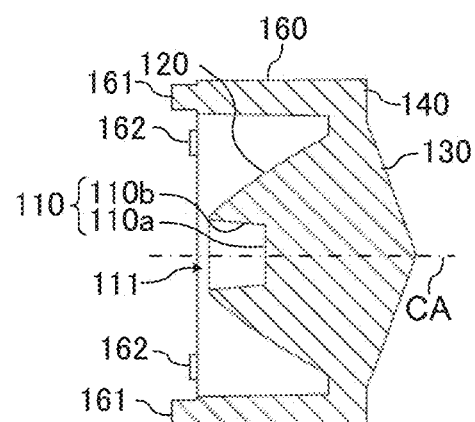
FIG. 4D is a sectional view illustrated along line D-D in FIG. 4A.
Figure 5A:
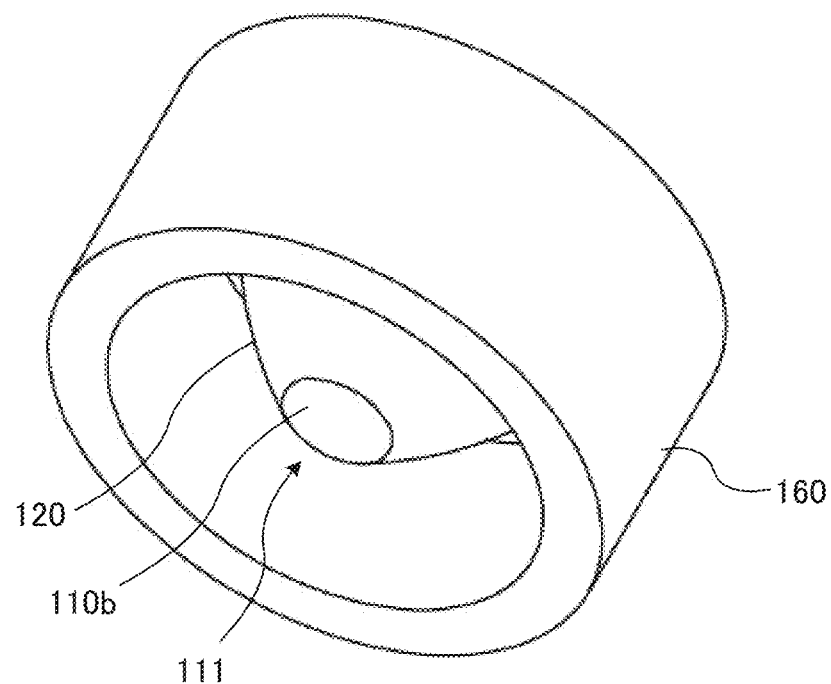
FIGS. 5A and 5B are perspective views of a light flux controlling member of an embodiment.
Figure 5B:
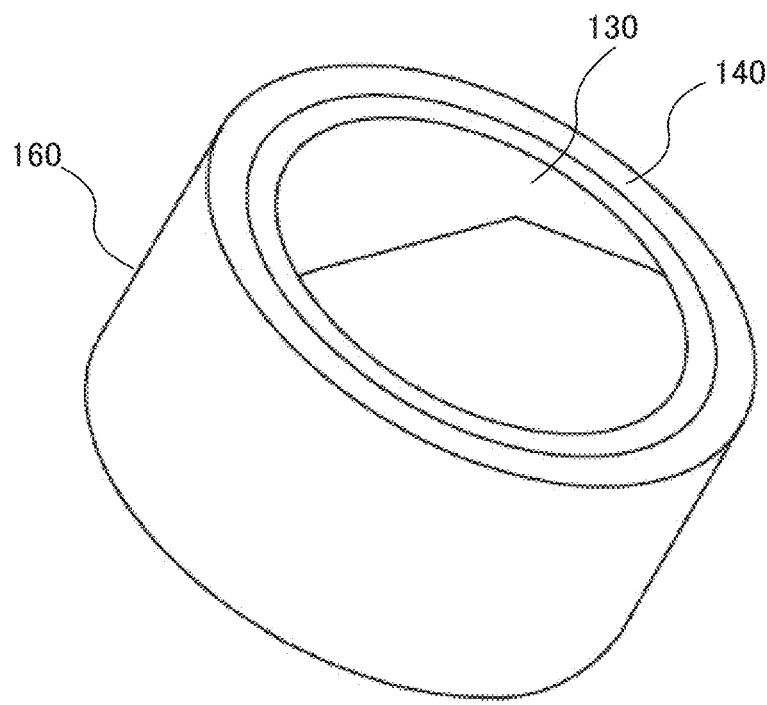

FIGS. 4A to 4D and 5A and 5B are drawings illustrating the configuration of light flux controlling member 100. FIG. 4A is a plan view of light flux controlling member 100. FIG. 4B is a sectional view illustrated along line B-B in FIG. 4A. FIG. 4C is a bottom view of light flux controlling member 100. FIG. 4D is a sectional view illustrated along line D-D in FIG. 4A. FIGS. 5A and 5B are perspective views of light flux controlling member 100. It is noted that, in FIGS. 5A and 5B, bosses (reference signs 161 and 162) in FIGS. 4B to 4D described later are omitted.

As illustrated in FIGS. 4A to 4D and 5A and 5B, light flux controlling member 100 has incidence surface 110, total reflection surface 120, emission surface 130, flange 140 and holder 160. In the following description, in light flux controlling member 100, the side facing light emitting element 210 and receiving light, i.e., the side surface side of casing 310 is referred to as "back side." In addition, in light flux controlling member 100, the side not facing light emitting element 210 and emitting light, i.e., reflection member 340 side (ridge line 340a side) is referred to as "front side." Furthermore, the central axis of rotationally symmetrical total reflection surface 120 is defined as "central axis CA of light flux controlling member 100."

Incidence surface 110 is an internal surface of recess 111 formed at the back side (light emitting element 210 side) of light flux controlling member 100 so as to intersect central axis CA (see FIGS. 4B and 4D). Incidence surface 110 allows light emitted from light emitting element 210 to enter light flux controlling member 100. Incidence surface 110 is a rotational symmetry surface about central axis CA. Incidence surface 110 includes internal top surface 110a constituting the top surface of recess 111, and tapered internal side surface 110b constituting the side surface of recess 111.

Total reflection surface 120 is a surface extending from the outer edge of the bottom of light flux controlling member 100 to the outer edge of emission surface 130 (more correctly, inner edge of flange 140) (see FIGS. 4B and 4D). Total reflection surface 120 reflects a part of light emitted from incidence surface 110 toward emission surface 130 (front side). Total reflection surface 120 is a rotational symmetry surface formed so as to surround central axis CA. The diameter of total reflection surface 120 is gradually increased from incidence surface 110 side (back side) to emission surface 130 side (front side). The generatrix constituting total reflection surface 120 (total reflection surface 120 in the sectional view including central axis CA) is an arc-like curve that is convex toward the outside (side away from central axis CA) (see FIGS. 4B and 4D).

Emission surface 130 is a surface positioned at the opposite side of incidence surface 110 (front side) in light flux controlling member 100, and is formed so as to intersect central axis CA. Emission surface 130 emits a part of light emitted from incidence surface 110 and light reflected at total reflection surface 120 toward the outside. Emission surface 130 is a rotational symmetry surface about central axis CA. The intersection point of emission surface 130 and central axis CA is the highest point from the back side (see FIGS. 4B and 4D). The generatrix constituting emission surface 130 (emission surface 130 in the sectional view including central axis CA) is an arc-like curve that is convex toward the front side.

Flange 140 is formed so as to extend in a radial direction (direction orthogonal to central axis CA) of emission surface 130 from the outer edges of total reflection surface 120 and emission surface 130. A light flux controlling member main body including incidence surface 110, total reflection surface 120 and emission surface 130 is connected to holder 160 via flange 140 (see FIGS. 4B and 4D).

Holder 160 is a substantially cylindrical member, and the upper end of holder 160 is connected to flange 140. Holder 160 supports the light flux controlling member main body including incidence surface 110, total reflection surface 120 and emission surface 130, as well as positions the light flux controlling member main body with respect to light emitting element 210. On the lower end of holder 160, there are formed two types of bosses (convex parts) 161 and 162. Higher two bosses 161 are fitted into through-holes or recesses provided in substrate 320, thereby positioning the light flux controlling member main body. Lower four bosses 162 are adhered onto substrate 320, thereby positioning the light flux controlling member main body.

Reflection member 340 is a member that reflects light emitted from light emitting device 200 toward the aforementioned opening. Reflection member 340 is a member having a light reflectivity protruded from bottom plate 312. Bottom plate 312 and reflection member 340 define a cavity that is a hollow area together with the side surface and the top surface. The internal surfaces of bottom plate 312 and reflection member 340 facing the cavity constitute "bottom surface." Reflection member 340 has ridge line 340a that is parallel to the internal surfaces (side surfaces) of a pair of sidewalls 313 and 315 facing each other and to the top surface. An apex of reflection member 340 is defined by a curved surface including ridge line 340a. The "ridge line" is a line defined by a set of apexes of reflection member 340. The shape of reflection member 340 in the cross section vertical to ridge line 340a is for example such a shape that oblique sides of a triangle having a base of 400 mm and a height of 20 mm are linked with an arc having a curvature radius of 500 mm (see FIG. 3B). It is noted that, from the viewpoint of effectively utilizing light emitted from light emitting device 200, the height of ridge line 340a is preferably higher than the height of optical axis LA of light emitting element 210. Further, reflection member 340 may be integrally formed with bottom plate 312. Alternatively, bottom plate 312 may be formed in such a shape as to have a ridge line, to dispose reflection member 340 on the entire surface of the bottom surface along the shape.

Light-emitting planar member 330 is a plate-like member having a light diffusing property and optical transparency. Light-emitting planar member 330 is disposed so as to cover the opening formed at top plate 311 of casing 310. Light-emitting planar member 330 transmits emitted light from light flux controlling member 100, reflected light from diffusion and reflection surface 312a and reflected light from reflection member 340 while diffusing the lights. Typically, light-emitting planar member 330 has roughly the same size as that of a liquid crystal panel, or the like. Light-emitting planar member 330 is formed for example of a light-transmissive resin such as polymethylmethacrylate (PMMA), polycarbonate (PC), polystyrene (PS), or styrene/methyl methacrylate copolymer resin (MS). In order to impart a light diffusing property, light-emitting planar member 330 has fine irregularities formed on the surface thereof, or light-emitting planar member 330 has light diffusers such as beads being dispersed therein.

[Travel of Light Inside Surface Light Source Device]

In surface light source device 300 of the present embodiment, light emitted from each light emitting element 210 is concentrated in the direction of optical axis LA (light distribution is made narrower) of each light emitting element 210 by light flux controlling member 100. Light flux controlling member 100 allows light to be emitted mainly toward reflection member 340. Most part of light emitted from light flux controlling member 100 directly reaches reflection member 340, is reflected at reflection member 340, and reaches the internal surface of light-emitting planar member 330. Further, a part of the light emitted from light flux controlling member 100 reaches the internal surface of light-emitting planar member 330 and the bottom surface. A part of light emitted from light flux controlling member 100 to reach the internal surface of light-emitting planar member 330 is transmitted through light-emitting planar member 330, and the rest of the light is reflected at light-emitting planar member 330 to reach reflection member 340. The light having reached reflection member 340 is reflected at reflection member 340, and reaches the internal surface of light-emitting planar member 330 again. On the other hand, the light emitted from light flux controlling member 100 to reach the bottom surface is reflected at the bottom surface, and reaches light-emitting planar member 330. The light having reached the internal surface of light-emitting planar member 330 via each of the paths is transmitted through light-emitting planar member 330 while being further diffused by light-emitting planar member 330. As a result, in light-emitting planar member 330, the brightness of the light emitting area (external surface of light-emitting planar member 330) is made uniform (with less luminance unevenness).

Figure 6A:
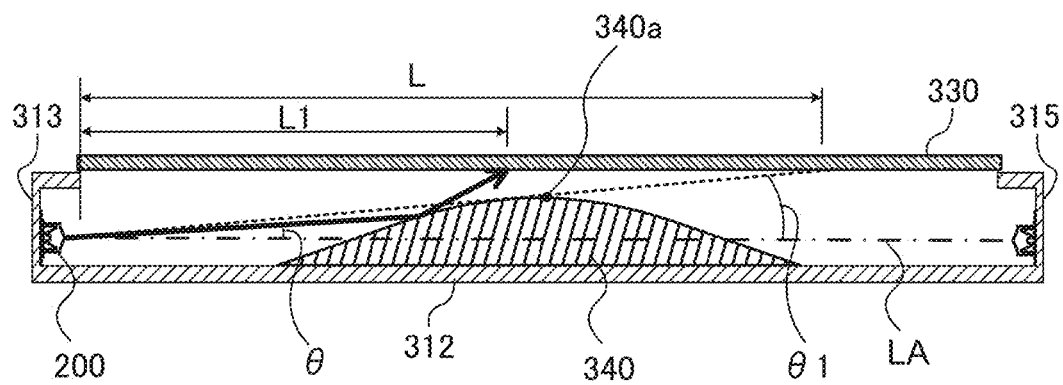
FIG. 6A is an explanatory drawing of an optical path of a light beam that is emitted from a light emitting device in an embodiment and reaches a reflection member.
Figure 6B:
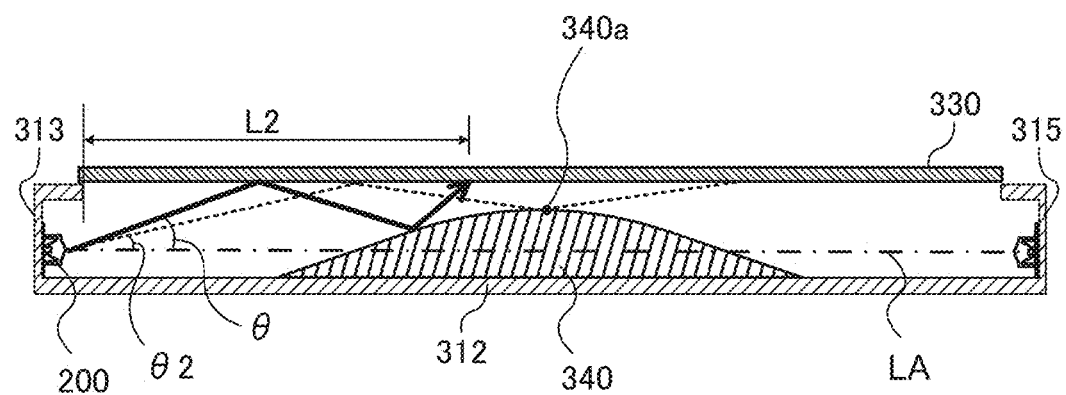
FIG. 6B is an explanatory drawing of an optical path of a light beam that is emitted from a light emitting device in the embodiment and reaches a light-emitting planar member.

The optical path of a light beam emitted from light emitting device 200 will be described with reference to the drawings, with light emitting device 200 on sidewall 313 side as an example. FIG. 6A is an explanatory drawing of an optical path of a light beam that is emitted from light emitting device 200 and directly reaches a reflection member 340. FIG. 6B is an explanatory drawing of an optical path of a light beam emitted from a light emitting device 200 and directly reaches a light-emitting planar member 330.

As described above, light emitting devices 200 are arranged such that optical axis LA of each light emitting element 210 is parallel to the base surface. Therefore, the light beam emitted from light emitting device 200 mainly reaches reflection member 340. As illustrated in FIG. 6A, the emission angle of the light beam (solid line) emitted from light emitting device 200 relative to optical axis LA (dashed line) is set as $\theta$. Emission angle $\theta$ is increased from optical axis LA to light-emitting planar member 330 side.

The light beam (solid line) having been emitted from light emitting device 200 at emission angle $\theta$ reaches reflection member 340, specularly reflected there once, and reaches light-emitting planar member 330. The distance between the reaching position of the aforementioned light beam where the aforementioned light beam reached light-emitting planar member 330 and the end part closest to light emitting device 200 having emitted the aforementioned light beam, of the light emitting area in light-emitting planar member 330, is set as L1 (light reaching distance). Light reaching distance L1 is for example a distance from the opening edge of top plate 311 at the side of light emitting device 200 that emits the aforementioned light beam to the reaching position of the aforementioned light beam in light-emitting planar member 330 (see FIG. 6A). The distance from sidewall 313 to top plate 311 is an entrance length, and is 30 mm, for example.

When emission angle $\theta$ becomes larger, the light beam emitted from light emitting device 200 becomes tangential to reflection member 340. As illustrated in FIG. 6A, the emission angle at that time is set as $\theta 1$.

When emission angle $\theta$ becomes larger than $\theta 1$, the light beam emitted from light emitting device 200 directly reaches light-emitting planar member 330. When emission angle $\theta$ becomes further larger, as illustrated in FIG. 6B, the light beam (solid line) emitted from light emitting device 200 reaches light-emitting planar member 330, is specularly reflected there to reach reflection member 340, and is further specularly reflected there to reach light-emitting planar member 330 again. The distance at that time between the reaching position of the light beam on the light-emitting planar member 330 and the end part closest to light emitting device 200 having emitted the aforementioned light beam, of the light emitting area in light-emitting planar member 330, is set as L2 (light reaching distance). Light reaching distance L2 is for example a distance from the opening edge of top plate 311 at the side of light emitting device 200 that emits the aforementioned light beam to the reaching position of the aforementioned light beam on light-emitting planar member 330 (see FIG. 6B). Further, as illustrated in FIG. 6B, the emission angle at which the light beam is emitted from light emitting device 200 to reach light-emitting planar member 330, reflected there, and reaches ridge line 340a of reflection member 340 is particularly set as θ2.

In the surface light source device of the present invention, the apex of reflection member 340 is formed of a curve including ridge line 340a, and thus the following two light emission characteristics are obtained:

1) $\Delta L1/\Delta\theta$ is gradually decreased in association with a decrease in θ within a certain range whose upper limit is θ1; and
2) $\Delta L2/\Delta\theta$ is gradually increased together with a decrease in L2 in association with an increase in θ within a certain range including θ2.

In the aforementioned 1), the "certain range equal to or less than θ1 including θ1" means that θ satisfies "$\theta 1-\alpha \leq \theta \leq \theta 1$" (where α is an arbitrary positive number). In the case of "$\theta 1-\alpha \leq \theta \leq \theta 1$," the light beam emitted from light emitting device 200 reaches a surface nearer to light emitting device 200 side than the tangent point with reflection member 340, of the surface of reflection member 340 (solid line in FIG. 6A). On the other hand, in the case of "θ=θ1," the light beam emitted from light emitting device 200 reaches light-emitting planar member 330 through the tangent point with reflection member 340 (broken line in FIG. 6A).

Further, in the aforementioned 2), the "certain range including θ2" means that θ satisfies "$\theta 2-\beta \leq \theta \leq \theta 2+\gamma$" (where β and γ are arbitrary positive numbers). In the case of "$\theta 2<\theta \leq \theta 2+\gamma$," the light beam emitted from light emitting device 200 reaches a surface nearer to light emitting device 200 side than ridge line 340a, of the surface of reflection member 340 (solid line in FIG. 6B). On the other hand, in the case of "$\theta 2-\beta \leq \theta \leq \theta 2$," the light beam emitted from light emitting device 200 reaches a surface beyond ridge line 340a (at sidewall 315 side), of the surface of reflection member 340. Further, in the case of "θ=θ2," the light beam emitted from light emitting device 200 reaches ridge line 340a of reflection member 340 (broken line in FIG. 6B).

The occurrence of a bright line in the light emitting area is caused by a sudden change of illuminance on the internal surface of light-emitting planar member 330. For example, as described hereinafter using a simulation, when the reflection angle of the light beam at the reflection member is suddenly changed in association with an increase in emission angle θ, the illuminance on the internal surface of light-emitting planar member 330 becomes irregular, causing a bright line to occur on the light emitting area.

In contrast, in surface light source device 300 of the present embodiment, reflection member 340 has a curved surface including ridge line 340a, and thus the reflection angle of the light beam in the vicinity of ridge line 340a can be changed continuously. Therefore, a sudden change of the illuminance on the internal surface of light-emitting planar member 330 is suppressed. Accordingly, in surface light source device 300 of the present embodiment, a bright line does not easily occur in the light emitting area.

Further, from the viewpoint of preventing luminance unevenness on the light emitting area, the distance between a position where a light beam emitted from light emitting device 200 at emission angle θ reaches light-emitting planar member 330 and an end part closest to light emitting device 200 (opening edge of top plate 311) that emitted the light beam, of the light emitting area in light-emitting planar member 330, is preferably greater than three-quarters of the dimension of the light emitting area in the direction between internal surfaces of a pair of sidewalls 313 and 315.

Hereinafter, the paths of light beams in the surface light source device of the present invention will be further described using the simulation results.

Figure 7A:
FIG. 7A is a transverse sectional view of a reflection member of a first embodiment.

A simulation was carried out for the light emission characteristics of surface light source device 300 of the present embodiment. First, emission angle θ of a light beam and the reaching distance L of the light beam at that time were calculated. The shape of reflection member 340 in the cross section vertical to the ridge line is such a shape that the apex of a triangle having a base length of 400 mm and a height of 20 mm is linked with an arc with a curvature radius of 500 mm (see FIG. 7A). The height of the ridge line of reflection member 340 is 17.506 mm.

Figure 7B:
FIGS. 7B to 7D are transverse sectional views of reflection members for comparison.
Figure 7C:
Figure 7D:

Further, for comparison, a similar simulation was also carried out for reflection members 810, 820, and 830 of which apexes are not formed with a curved surface. Each of reflection members 810, 820, and 830 differ from reflection member 340 in the sectional shape. Reflection member 810 in the cross section vertical to the ridge line is shaped to be a triangle having a base length of 400 mm and a height of 20 mm (see FIG. 7B). Reflection member 820 in the cross section vertical to the ridge line is shaped to be an approximate triangle having a base length of 400 mm and a height of 20 mm, of which oblique sides are concave curves having a curvature radius of 1,018 mm (see FIG. 7C). Reflection member 830 in the cross section vertical to the ridge line is shaped to be a trapezoid in which the apex of a triangle having a base length of 400 mm and a height of 20 mm is truncated at the height of 15 mm (see FIG. 7D).

Figure 8A:
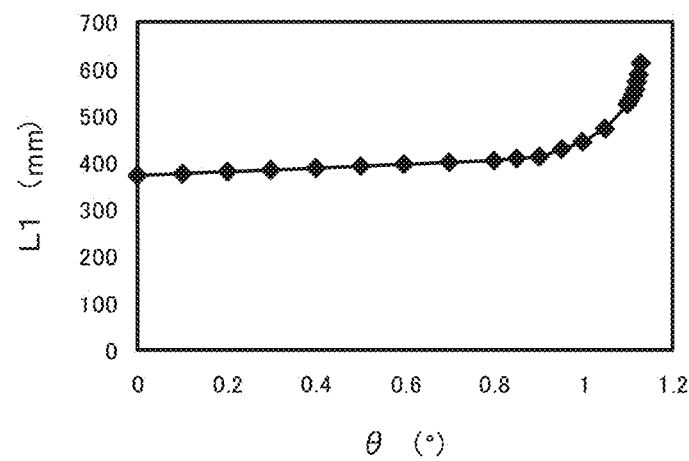
FIG. 8A is a graph illustrating the relationship between light beam emission angle θ and light beam reaching distance L1 in a surface light source device having the reflection member of the first embodiment.
Figure 8B:
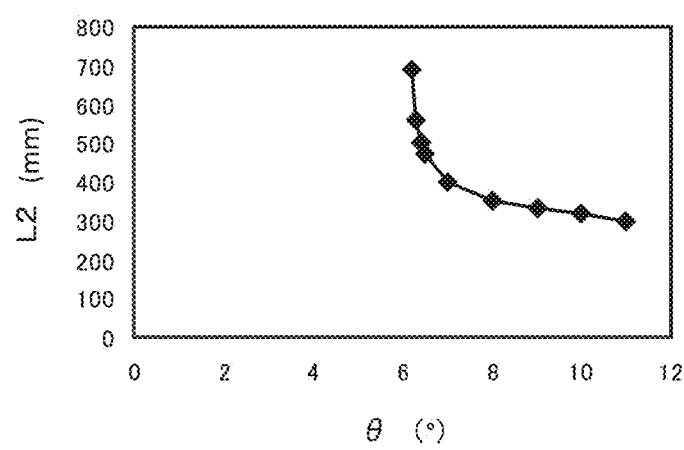
FIG. 8B is a graph illustrating the relationship between light beam emission angle θ and light beam reaching distance L2 in the surface light source device.
Figure 11A:
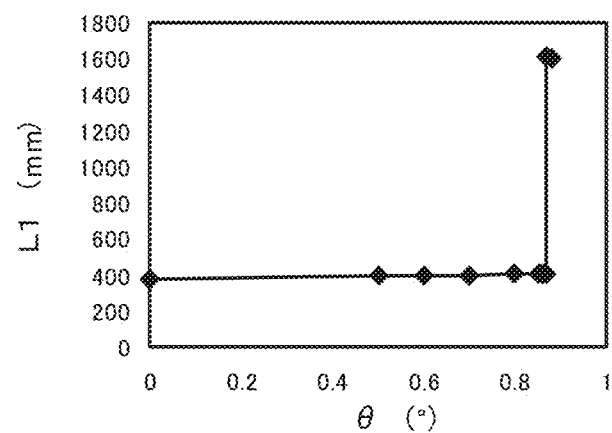
FIG. 11A is a graph illustrating the relationship between light beam emission angle θ and light beam reaching distance L1 in a surface light source device having a reflection member for the third comparison.
Figure 11B:
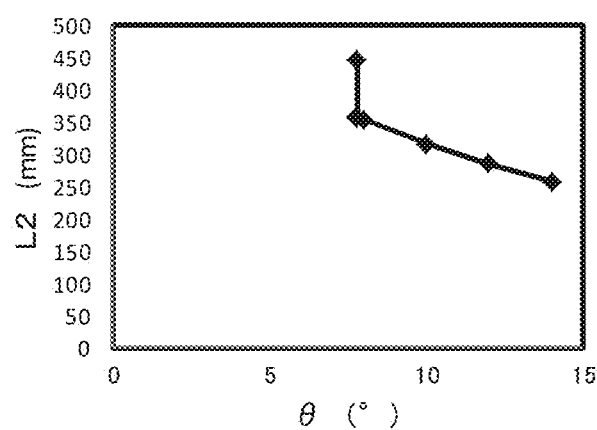
FIG. 11B is a graph illustrating the relationship between light beam emission angle θ and light beam reaching distance L2 in the surface light source device.

FIGS. 8A and 8B to 11A and 11B are graphs illustrating the simulation results. FIG. 8A is a graph illustrating the relationship between emission angle θ and light beam reaching distance L1 when light beam emission angle θ is θ1 or less in surface light source device 300 of the present embodiment having reflection member 340. FIG. 8B is a graph illustrating the relationship between emission angle θ and light beam reaching distance L2 when light beam emission angle θ is θ2 or more. FIG. 9A is a graph illustrating the relationship between emission angle θ and light beam reaching distance L1 when light beam emission angle θ is θ1 or less in a surface light source device for comparison having reflection member 810, and FIG. 9B is a graph illustrating the relationship between emission angle θ and light beam reaching distance L2 when light beam emission angle θ is θ2 or more. FIG. 10A is a graph illustrating the relationship between emission angle θ and light beam reaching distance L1 when light beam emission angle θ is θ1 or less in a surface light source device for comparison having reflection member 820, and FIG. 10B is a graph illustrating the relationship between emission angle θ and light beam reaching distance L2 when light beam emission angle θ is θ2 or more. FIG. 11A is a graph illustrating the relationship between emission angle θ and light beam reaching distance L1 when light beam emission angle θ is θ1 or less in a surface light source device for comparison having reflection member 830, and FIG. 11B is a graph illustrating the relationship between emission angle θ and light beam reaching distance L2 when light beam emission angle θ is θ2 or more. It is noted that, for the surface light source device for comparison having reflection member 830 (see FIG. 7D), the emission angle of the light beam that reaches a ridge line at the side of light emitting device 200, out of the two ridge lines of reflection member 830, was set as θ2.

As illustrated in FIG. 8A, in surface light source device 300 of the present embodiment, when emission angle θ is increased from 0° to emission angle θ1 (about 1.15°), reaching distance L1 is continuously increased. When emission angle θ is within a range of 0° to about 0.8°, the ratio of the increment of reaching distance L1 (ΔL1) relative to the increment of emission angle θ (Δθ), (ΔL1/Δθ), is substantially constant. On the other hand, ΔL1/Δθ is gradually increased near θ1. The light beam at emission angle θ is tangential to reflection member 340. At that time, light beam reaching distance (L) is about 600 mm. Thus, within a range from certain angle θ (e.g., about 0.8°) to θ1, ΔL1/Δθ is gradually increased in association with an increase in θ. That is, in surface light source device 300, within a certain range whose upper limit is θ1, ΔL1/Δθ is gradually decreased in association with a decrease in θ.

As illustrated in FIG. 8B, in surface light source device 300 of the present embodiment, when emission angle θ is increased from a set angle smaller than θ2 (about 6.4°), light beam reaching distance L2 is continuously decreased. When emission angle θ is within a range of about 6° to about 8°, ΔL2/Δθ is gradually increased. On the other hand, when emission angle θ is greater than about 8°, ΔL2/Δθ is substantially constant. Thus, in surface light source device 300, within a certain range including θ2, ΔL2/Δθ is gradually increased together with a decrease in L2 in association with an increase in θ.

From these results, it is observed that, in surface light source device 300, when emission angle θ of the light from light emitting device 200 is changed, ΔL1/Δθ and light beam reaching distances L1 and L2 are changed continuously. Therefore, a sudden change of the illuminance on the internal surface of light-emitting planar member 330 is suppressed. Accordingly, in surface light source device 300 of the present embodiment, a bright line does not easily occur in the light emitting area.

Figure 9A:
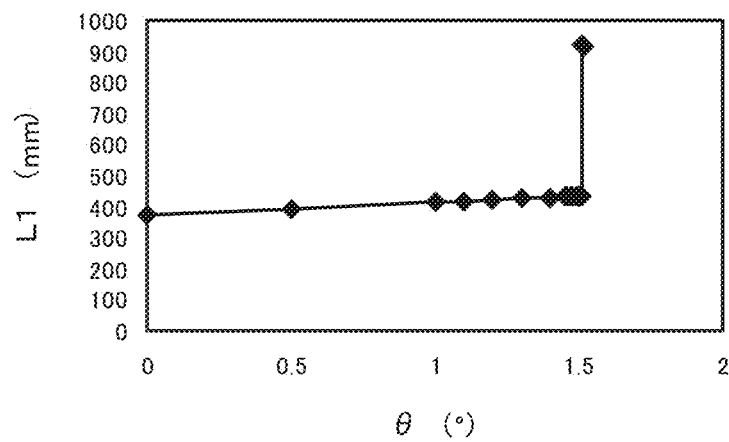
FIG. 9A is a graph illustrating the relationship between light beam emission angle θ and light beam reaching distance L1 in a surface light source device having a reflection member for the first comparison.

In contrast thereto, as illustrated in FIG. 9A, in the surface light source device for comparison having reflection member 810, when emission angle θ is increased by gradation up to θ1, reaching distance L1 is gradually increased, while ΔL1/Δθ remains substantially constant. Further, when emission angle θ comes to θ1, ΔL1/Δθ and reaching distance L1 are suddenly increased. Thus, in the surface light source device having reflection member 810, ΔL1/Δθ and light beam reaching distance L1 are changed discontinuously. Such reflection of the light beam causes a sudden change of illuminance to occur on the internal surface of the light-emitting planar member. Such discontinuous reflection is also seen in the surface light source device having reflection member 820 and the surface light source device having reflection member 830 (see FIGS. 10A and 11A).

Figure 9B:
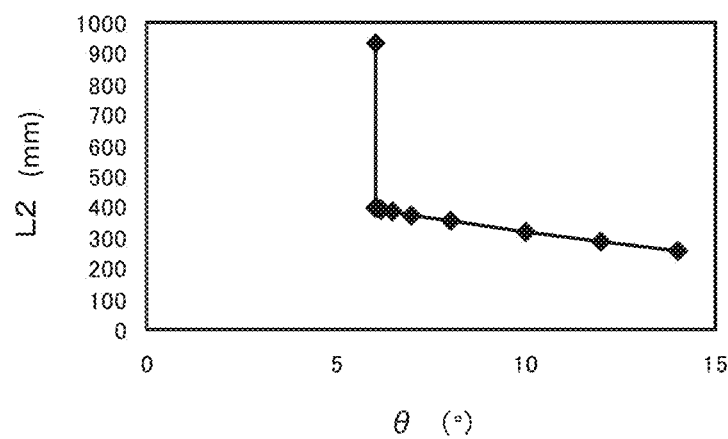
FIG. 9B is a graph illustrating the relationship between light beam emission angle θ and light beam reaching distance L2 in the surface light source device.
Figure 10A:
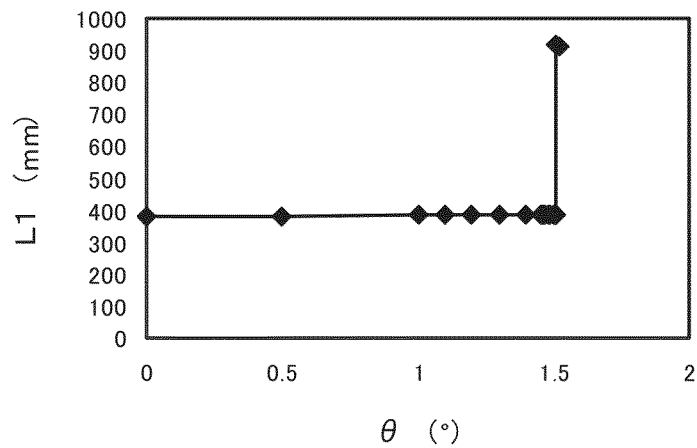
FIG. 10A is a graph illustrating the relationship between light beam emission angle θ and light beam reaching distance L1 in a surface light source device having a reflection member for the second comparison.
Figure 10B:
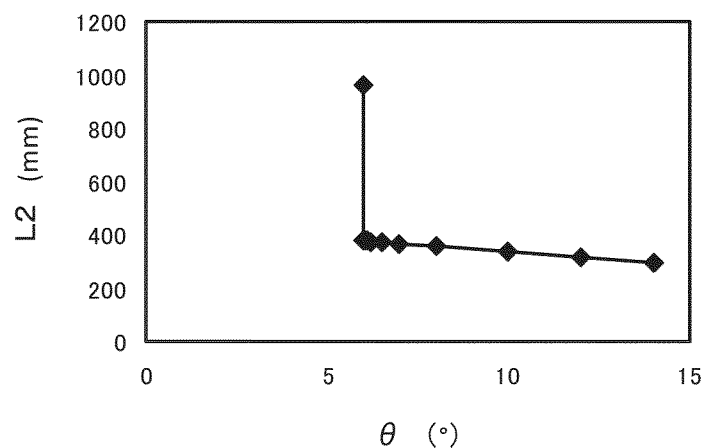
FIG. 10B is a graph illustrating the relationship between light beam emission angle θ and light beam reaching distance L2 in the surface light source device.

Also, with regard to light beam reaching distance L2, as illustrated in FIG. 9B, in the surface light source device for comparison having reflection member 810, when emission angle θ is increased near θ2, light beam reaching distance L2 is suddenly decreased. Then, when emission angle θ is further increased, reaching distance L2 is gradually decreased, while ΔL2/Δθ remains substantially constant. Thus, in the surface light source device having reflection member 810, ΔL2/Δθ and light beam reaching distance L2 are changed discontinuously. Such reflection of the light beam causes a sudden change of illuminance to occur on the internal surface of the light-emitting planar member. Such discontinuous reflection is also seen in the surface light source device having reflection member 820 and the surface light source device having reflection member 830 (see FIGS. 10B and 11B). It is noted that, in FIGS. 9B and 10B, the point of light beam reaching distance L2 beyond 700 mm indicates a virtual point.

Next, a simulation was carried out for the distribution of brightness on light-emitting planar member 330 of surface light source device 300 of the present embodiment. As illustrated in FIGS. 2 and 3, by using surface light source device 300 in which nine light emitting devices 200 are fixed to each of two sidewalls 313 and 315 facing each other, the illuminance of a measurement surface disposed 0.5 mm away from light-emitting planar member 330 was measured. The measurement surface is a virtual surface that is supposed to be illuminated by light transmitted through light-emitting planar member 330. The illuminance distribution to be obtained by the simulation is equivalent to the illuminance distribution on light-emitting planar member 330.

Figure 12:
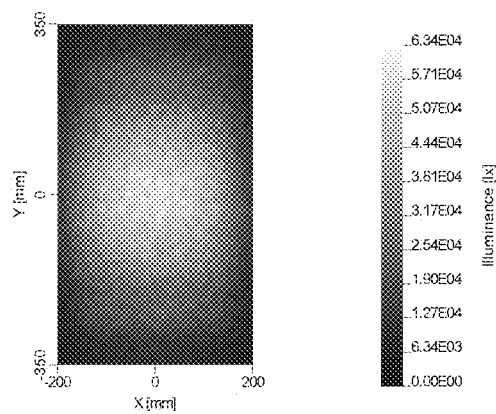
FIG. 12 is a drawing illustrating the illuminance distribution of a light emitting area of the surface light source device of the embodiment.
Figure 13A:
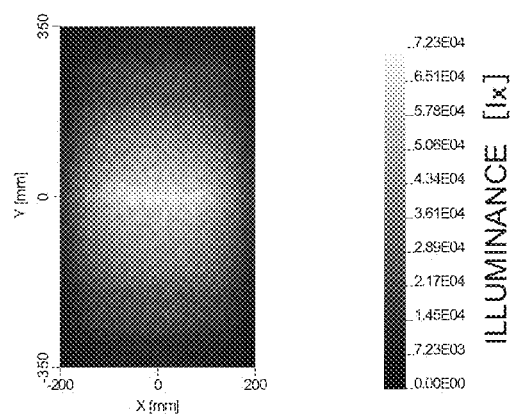
FIG. 13A is a drawing illustrating the illuminance distribution of a light emitting area of a surface light source device having the reflection member for the first comparison.
Figure 13B:
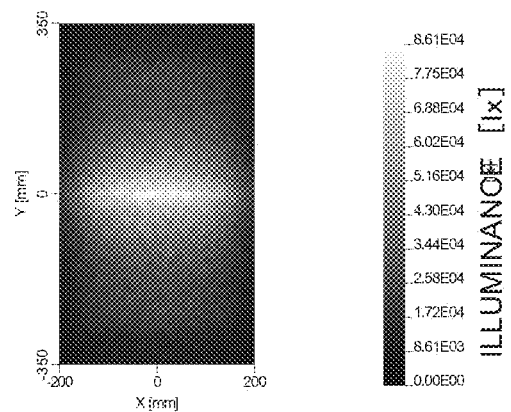
FIG. 13B is a drawing illustrating the illuminance distribution of a light emitting area of the surface light source device having the reflection member for the second comparison.
Figure 13C:
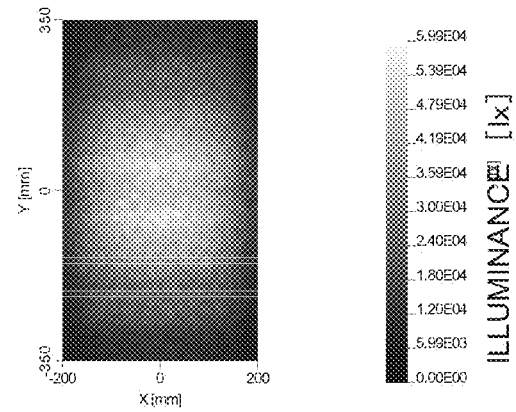
FIG. 13C is a drawing illustrating the illuminance distribution of a light emitting area of the surface light source device having the reflection member for the third comparison.

FIG. 12 is a drawing illustrating the illuminance distribution (luminance distribution) of surface light source device 300 of the present embodiment. FIG. 13A is a drawing illustrating the illuminance distribution (luminance distribution) of the surface light source device for comparison having reflection member 810. FIG. 13B is a drawing illustrating the illuminance distribution (luminance distribution) of the surface light source device for comparison having reflection member 820. FIG. 13C is a drawing illustrating the illuminance distribution (luminance distribution) of the surface light source device for comparison having reflection member 830.

As illustrated in FIGS. 13A and 13B, in the surface light source device for comparison having reflection member 810 and the surface light source device for comparison having reflection member 820, one bright line undesirably occurs in the central portion of the light emitting area. Further, as illustrated in FIG. 13C, in the surface light source device for comparison having reflection member 830, two bright lines undesirably occur in the central portion of the light emitting area. In contrast thereto, in surface light source device 300 of the present embodiment, as illustrated in FIG. 12, no bright line is formed in the central portion of light-emitting planar member 330, and thus there is less luminance unevenness compared to the surface light source devices for comparison.

From these results, it can be observed that surface light source device 300 of the present embodiment can suppress the formation of a bright line on the light emitting area.

Furthermore, a simulation was carried out also for the illuminance distribution (luminance distribution) of the surface light source device of the present invention having a reflection member of which curvature radius of the curved surface near the ridge line differs from that of reflection member 340. The shape of the reflection member in the cross section vertical to the ridge line is such a shape that the apex of a triangle having a base length of 400 mm and a height of 20 mm is linked with an arc with a curvature radius (R) of 1,000 mm.

Figure 14A:
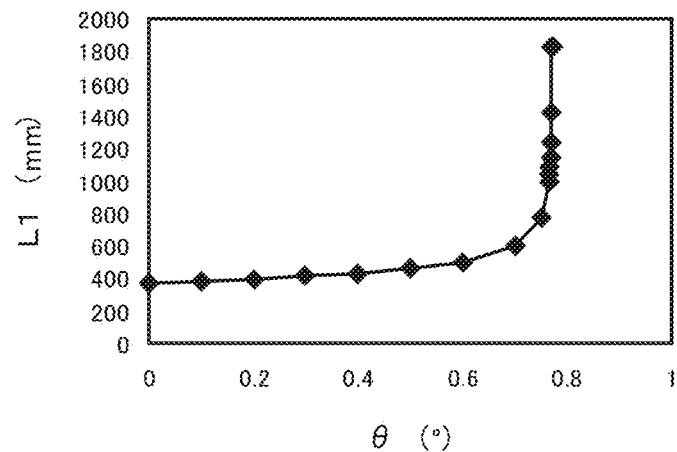
FIG. 14A is a graph illustrating the relationship between light beam emission angle θ and light beam reaching distance L1 in a surface light source device having a reflection member for a second embodiment.
Figure 14B:
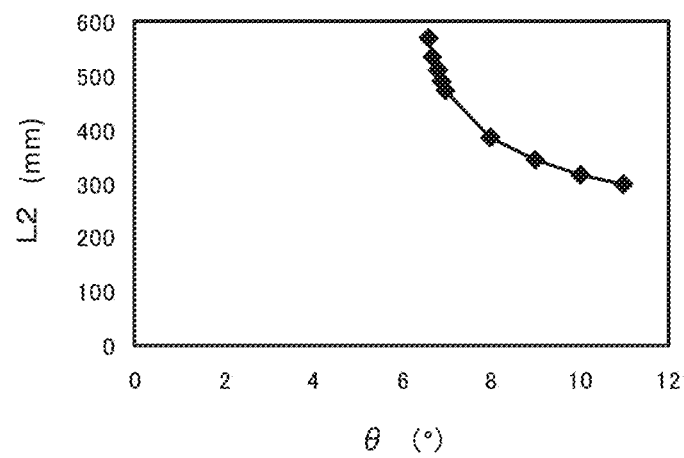
FIG. 14B is a graph illustrating the relationship between light beam emission angle θ and light beam reaching distance L2 in the surface light source device.

FIGS. 14A and 14B are graphs illustrating the simulation results. FIG. 14A is a graph illustrating the relationship between emission angle θ and light beam reaching distance L1 when light beam emission angle θ is θ1 or less in the surface light source device having the reflection member having R of 1,000 mm, and FIG. 14B is a graph illustrating the relationship between emission angle θ and light beam reaching distance L2 when light beam emission angle θ is θ2 or more.

As illustrated in FIGS. 14A and 14B, even in the surface light source device having the reflection member having R of 1,000 mm, within a certain range whose upper limit is θ1, ΔL1/Δθ is gradually decreased in association with a decrease in θ in the same manner as in surface light source device 300 (see FIG. 14A). In addition, within a certain range including θ2, ΔL2/Δθ is gradually increased together with a decrease in L2 in association with an increase in θ (see FIG. 14B).

From these results, it can be observed that the surface light source device having the reflection member having R of 1,000 mm can also prevent the formation of a bright line on the light emitting area.

Furthermore, a simulation was carried out also for an optical path of a light beam in the surface light source devices of the present invention having reflection members 910 and 920 of which ridge lines have heights different from that of reflection member 340.

Figure 15A:
FIG. 15A is a transverse sectional view of the reflection member of the first embodiment.
Figure 15B:
FIG. 15B is a transverse sectional view of a reflection member of a third embodiment.
Figure 15C:
FIG. 15C is a transverse sectional view of a reflection member of a fourth embodiment.

The shape of reflection member 910 in the cross section vertical to the ridge line is such a shape that the apex of a triangle having a base length of 400 mm and a height of 30 mm is linked with an arc with a curvature radius of 500 mm (see FIG. 15B). The height of the ridge line of reflection member 910 is 24.406 mm. The shape of reflection member 920 in the cross section vertical to the ridge line is such a shape that the apex of a triangle having a base length of 400 mm and a height of 40 mm is linked with an arc with a curvature radius of 500 mm (see FIG. 15C). The height of the ridge line of reflection member 920 is 30.098 mm.

Figure 16:
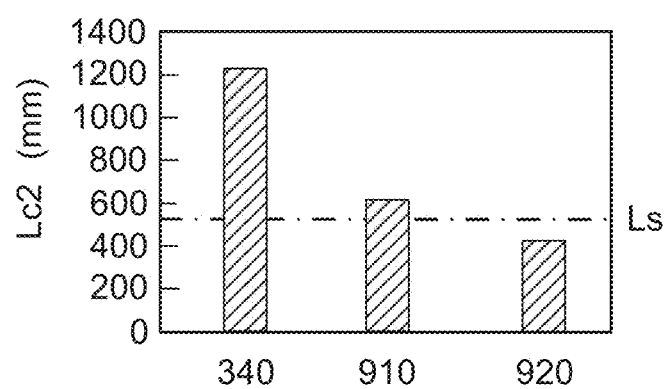
FIG. 16 is a graph illustrating tangential light beam reaching distance Lc2 in surface light source devices having reflection members of the first, third and fourth embodiments.
Figure 17A:
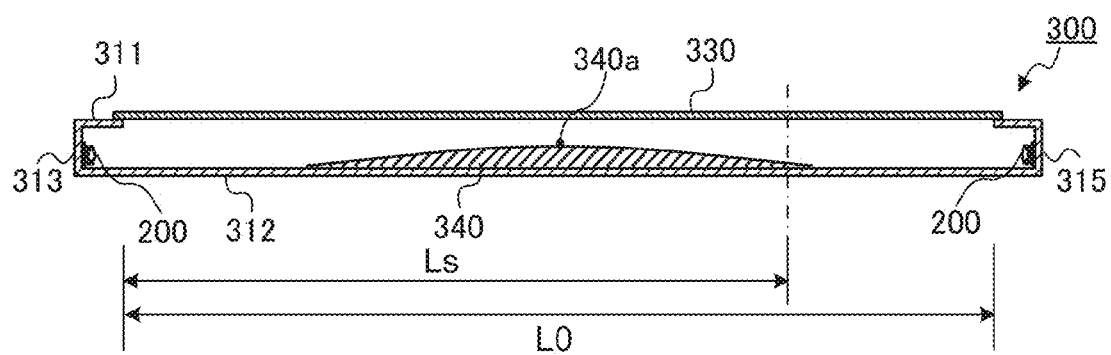
FIGS. 17A and B are explanatory drawings of light beam reaching distance Ls.
Figure 17B:
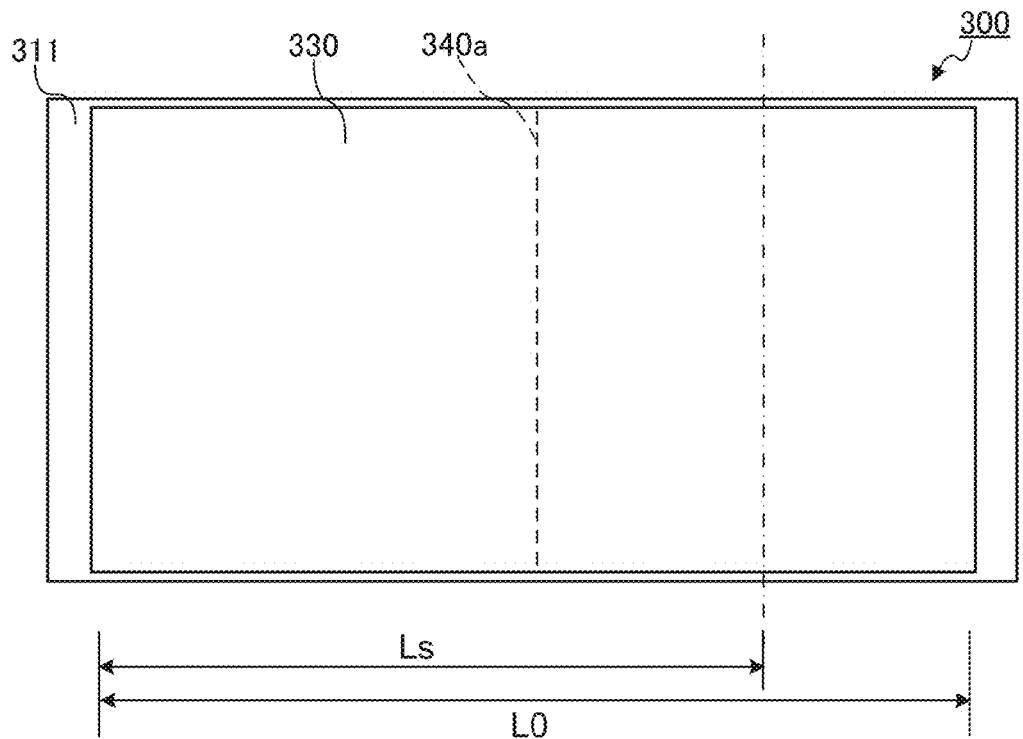

Simulation results are indicated in FIG. 16 and Table 1. FIG. 16 is a graph illustrating light beam reaching distance L1 of surface light source device 300, the surface light source device having reflection member 910 and the surface light source device having reflection member 920. The "light beam reaching determination distance (Ls)" in FIG. 16 and Table 1 indicates a distance that is three-quarters of the dimension between edge sides (LO) of the light emitting area corresponding to a pair of sidewalls 313 and 315 on which light emitting devices 200 that emit a light beam are disposed. In this simulation, Ls indicates the position of 575 mm from sidewall 313 (see FIG. 17). The "optical axis light beam reaching position Lc1" in Table 1 is a distance between a position where a light beam emitted from light emitting device 200 along optical axis LA is reflected at a reflection member to reach light-emitting planar member 330 and the opening edge of top plate 311 at light emitting device 200 side. The "tangential light beam reaching distance Lc2" in FIG. 16 and Table 1 is a distance between a position where a light beam emitted from light emitting device 200 to be tangential to the reflection member reaches light-emitting planar member 330 and the opening edge of top plate 311 at light emitting device 200 side. Tangential light beam reaching distance Lc2 beyond 700 mm indicates a virtual point. The reference signs "340," "910" and "920" in the abscissa in FIG. 16 mean, respectively, "reflection member 340," "reflection member 910" and "reflection member 920."

TABLE 1

|  | Reflection Member 340 | Reflection Member 910 | Reflection Member 920 |
|---|---|---|---|
| Optical Axis Light Beam Reaching Distance Lc1 (mm) | 373.76 | 298.13 | 260.00 |
| Tangential Light Beam Reaching Distance Lc2 (mm) | 1217.08 | 612.03 | 425.45 |
| Light Beam Reaching Determination Distance Ls (mm) | 525 | 525 | 525 |
| Emission Angle (°) of Tangential Light Beam | 1.149 | 2.232 | 3.146 |

As illustrated in in FIG. 16 and Table 1, in surface light source device 300, tangential light beam reaching distance Lc2 far surpasses light beam reaching determination distance Ls. In the surface light source device having reflection member 910, tangential light beam reaching distance Lc2 far surpasses light beam reaching determination distance Ls. In the surface light source device having reflection member 920, tangential light beam reaching distance Lc2 is far below light beam reaching determination distance Ls.

Figure 18A:
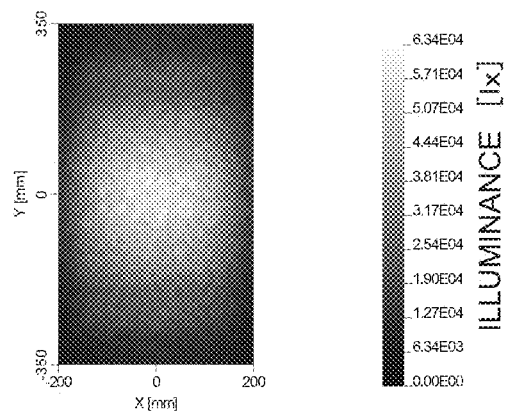
FIG. 18A is a drawing illustrating the illuminance distribution of a light emitting area of the surface light source device having the reflection member of the first embodiment.
Figure 18B:
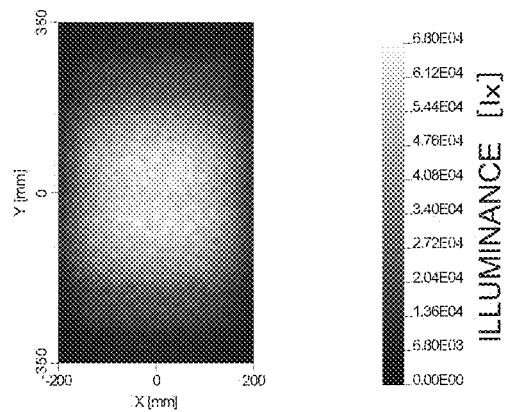
FIG. 18B is a drawing illustrating the illuminance distribution of a light emitting area of the surface light source device having the reflection member of the third embodiment.
Figure 18C:
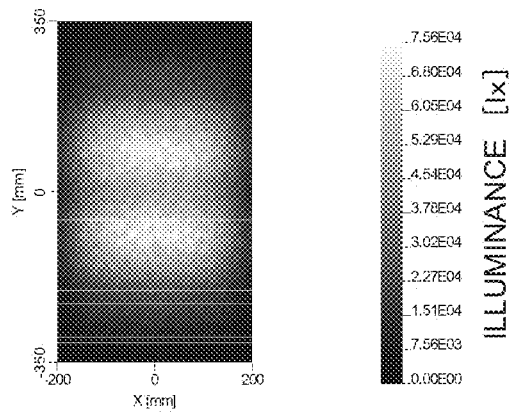
FIG. 18C is a drawing illustrating the illuminance distribution of a light emitting area of the surface light source device having the reflection member of the fourth embodiment.

Furthermore, a simulation was carried out for the illuminance distributions of the surface light source device having reflection member 910 and the surface light source device having reflection member 920. FIG. 18A is a drawing illustrating the illuminance distribution of surface light source device 300. FIG. 18B is a drawing illustrating the illuminance distribution of the surface light source device having reflection member 910. FIG. 18C is a drawing illustrating the illuminance distribution of the surface light source device having reflection member 920. It is noted that the illuminance distribution to be obtained by the simulation is also the illuminance of the virtual measurement surface disposed 0.5 mm away from light-emitting planar member 330.

As illustrated in FIG. 18B, in the surface light source device having reflection member 910, a light emitting area having a uniform luminance is formed at the central portion of light-emitting planar member 330. On the other hand, as illustrated in FIG. 18C, in the surface light source device having reflection member 920, two light emitting areas undesirably occur at the central portion of light-emitting planar member 330. From these results, it can be observed that, from the viewpoint of further reducing luminance unevenness, it is preferable to adjust the height of the ridge line of the reflection member such that tangential light beam reaching distance Lc2 can surpass light beam reaching determination distance Ls.

[Effect]

In surface light source device 300 of the present embodiment, $\Delta L1/\Delta\theta$ and $\Delta L2/\Delta\theta$ and light beam reaching distances L1 and L2 are changed continuously relative to emission angle θ of a light beam from light emitting device 200, and thus it becomes possible to suppress the occurrence of a bright line on the light emitting area.

Figure 19A:
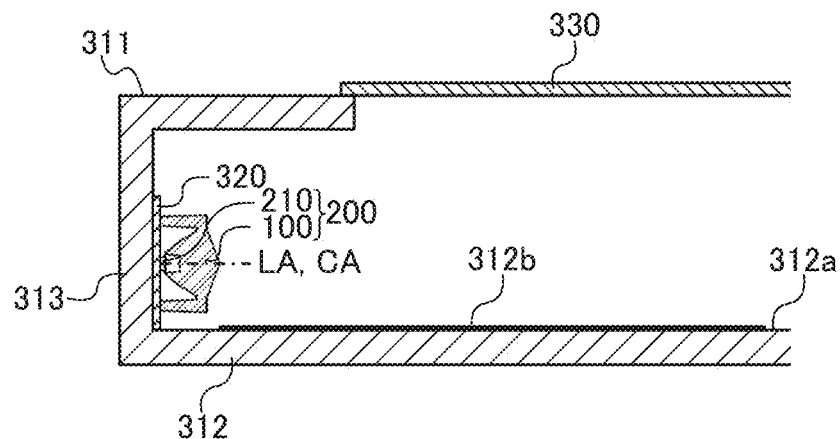
FIGS. 19A to 19C are drawings illustrating the configuration of modifications of the surface light source devices of the present invention.

It is noted that, while description has been made in the present embodiment on the surface light source device in which the entire area of the internal surface of bottom plate 312 constitutes diffusion and reflection surface 312a, it is also possible to form specular reflection surface 312b in an area in the vicinity of light flux controlling member 100 of the internal surface of bottom plate 312, as illustrated in FIG. 19A (sectional view).

Figure 19B:
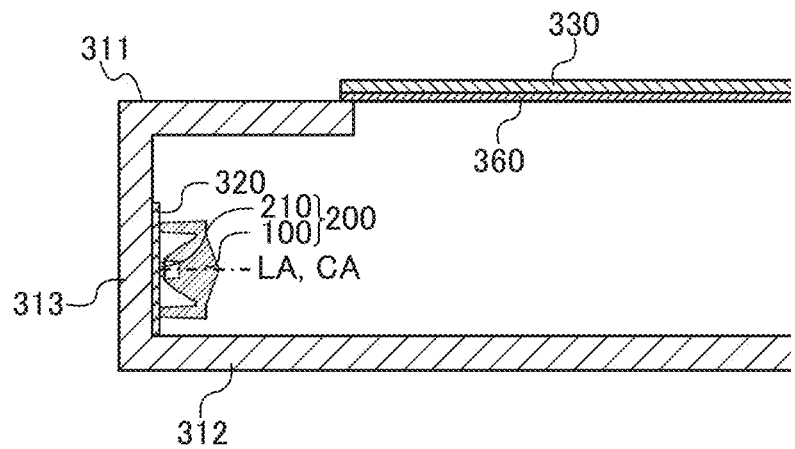

Further, while description has been made in the present embodiment on the surface light source device in which light having passed through the opening of top plate 311 directly reaches light-emitting planar member 330, it is also possible to dispose prism sheet 360 on the internal surface of light-emitting planar member 330, as illustrated in FIG. 19B (sectional view). On prism sheet 360, a plurality of sectionally triangular protrusions are formed along the direction of optical axis LA of light emitting element 210 so as to face light-emitting planar member 330. The protrusion of prism sheet 360 functions as a total reflection prism, and reflects light having reached toward bottom plate 312 side, thereby guiding light emitted from light flux controlling member 100 farther.

Figure 19C:
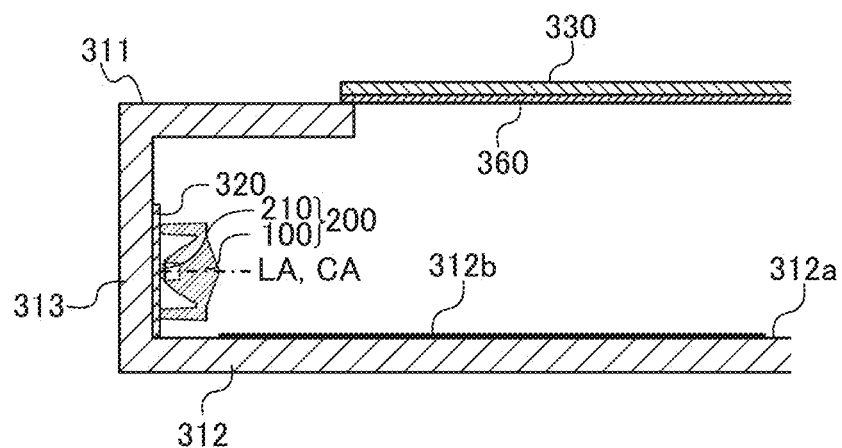

Furthermore, as illustrated in FIG. 19C (sectional view), it is also possible to dispose specular reflection surface 312b and prism sheet 360.

Figure 20A:
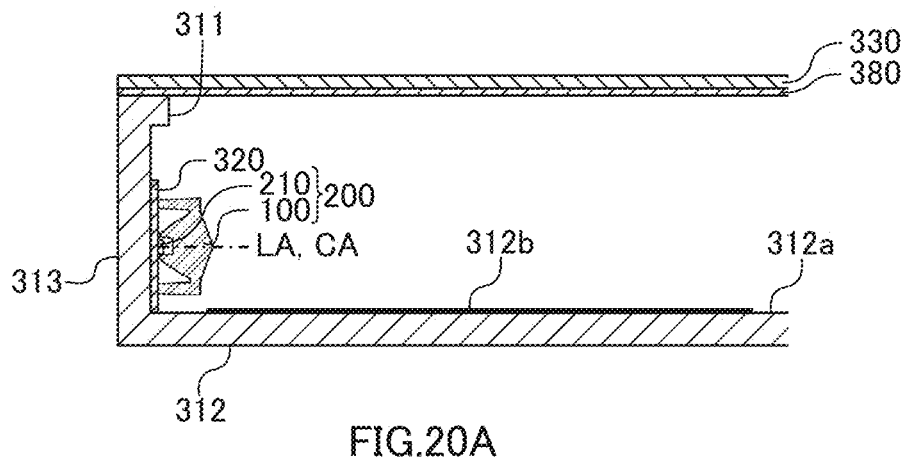
FIGS. 20A to 20C are drawings illustrating the configuration of other modifications of the surface light source device of the present invention.

Further, as illustrated in FIG. 20A (sectional view), it is also possible to dispose light adjustment member 380 instead of prism sheet 360 in the surface light source device illustrated in FIG. 19C.

Figure 21A:
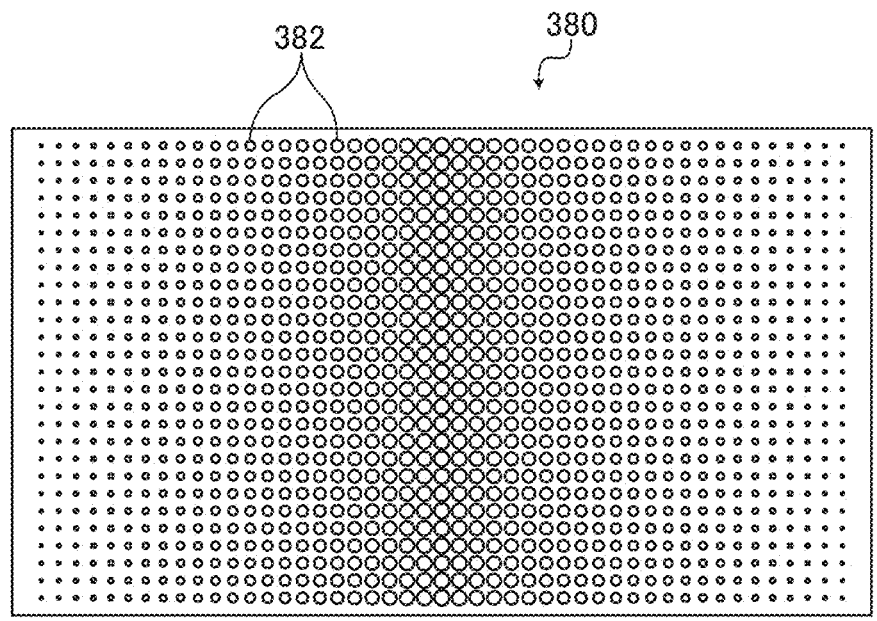
FIGS. 21A and 21B are drawings illustrating the configuration of a light adjustment member.
Figure 21B:
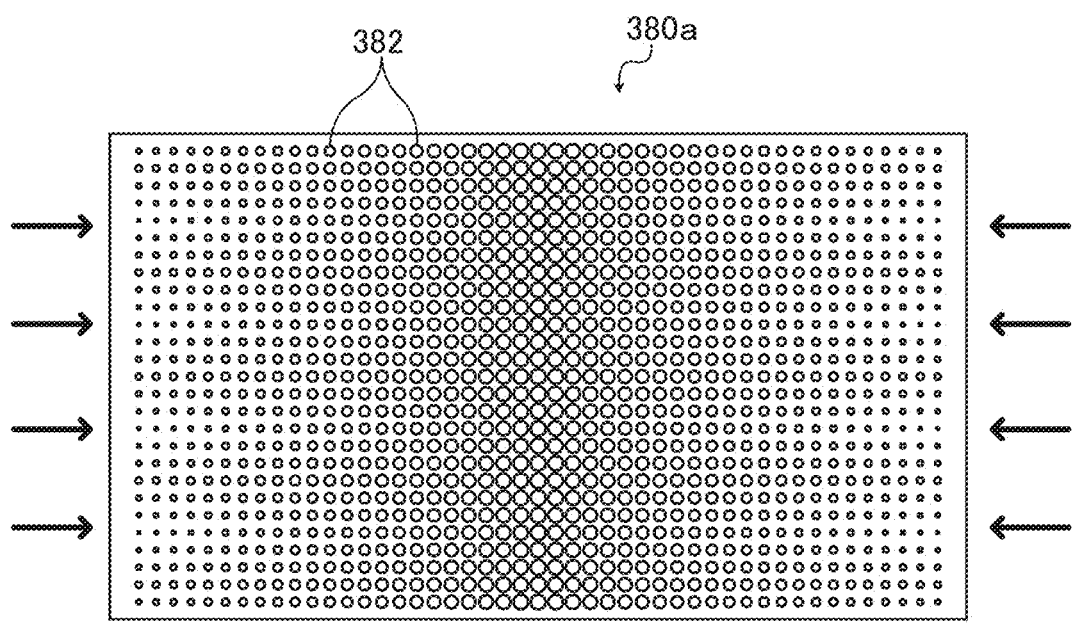

FIGS. 21A and 21B are drawings illustrating the configuration of light adjustment member 380. FIG. 21A is a plan view of light adjustment member 380, and FIG. 21B is a plan view of light adjustment member 380a of a modification.

As illustrated in FIG. 21A, light adjustment member 380 is a plate-like member that diffuses and reflects as well as transmits light having reached. Light adjustment member 380 has substantially the same size as that of light-emitting planar member 330 or prism sheet 360, and has a plurality of through-holes 382. While the material for light adjustment member 380 is not particularly limited, it is preferable to use a material having a reflectance of about 98%, a light transmittance of about 1% and a light absorptivity of about 1%. For example, the material for light adjustment member 380 is polyethylene terephthalate resin foamed with carbon dioxide gas. Alternatively, light adjustment member 380 may be formed by applying emulsionized microparticles of polytetrafluoroethylene (PTFE) to the surface of a transmissive plate-like member formed of a light-transmissive resin such as polymethylmethacrylate (PMMA), polycarbonate (PC), or epoxy resin (EP), or of glass. In this case, the light transmittance and the light reflectance of the plate-like member can be adjusted by the amount of applied emulsionized microparticles of polytetrafluoroethylene.

Through-holes 382 are formed on the entire area of light adjustment member 380. The size of through-holes 382 is smaller in the vicinity of light emitting element 210, and becomes larger as being away from light emitting element 210. Thereby, light adjustment member 380 illustrated in FIG. 21A has a function of adjusting the amount of light passing through in the major axis direction. In the example illustrated in FIG. 21A, the size of through-holes 382 is constant in the minor axis direction of light adjustment member 380.

On the other hand, when the surface light source device has a plurality of light emitting devices 200, the size of through-holes 382 may be changed also in the minor axis direction of light adjustment member 380a, as illustrated in FIG. 21B. In the example illustrated in FIG. 21B, the size of through-holes 382 is smaller in the vicinity of light emitting element 210, and becomes larger as being away from light emitting element 210 also in the minor axis direction of light adjustment member 380a. It is noted that, in FIG. 21B, there is illustrated an example in which four light emitting devices 210 (indicated by arrows) are disposed on one side. Light adjustment member 380a illustrated in FIG. 21B has a function of adjusting the amount of light passing through not only in the major axis direction but also in the minor axis direction.

Thus, in the surface light source device illustrated in FIG. 20A, the brightness of the light emitting area (external surface of light-emitting planar member 330) is made more uniform (smaller luminance unevenness) by light adjustment member 380 that adjusts the amount of transmission of light depending on the distance from light emitting element 210.

Figure 20B:
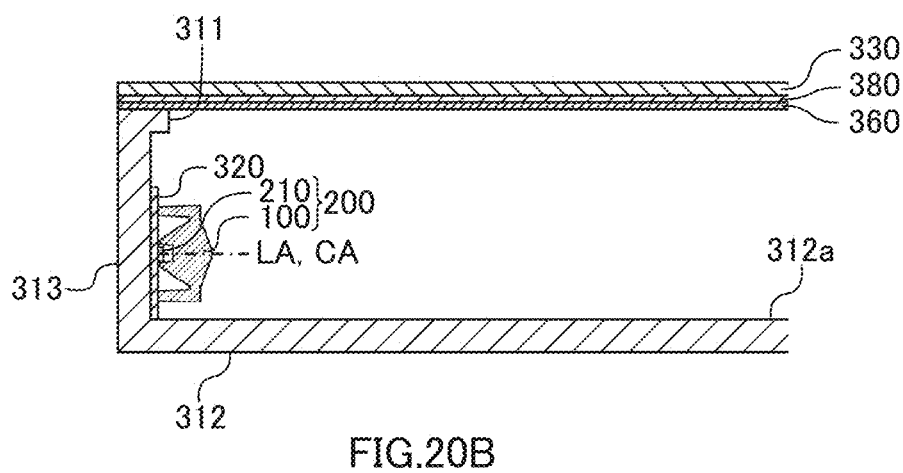

Further, as illustrated in FIG. 20B (sectional view), in the surface light source device illustrated in FIG. 19B, light adjustment member 380 may be disposed between light-emitting planar member 330 and prism sheet 360. That is, prism sheet 360, light adjustment member 380 and light-emitting planar member 330 may be disposed in the order presented from bottom plate 312 side. Thereby, it becomes possible to obtain both the retroreflection effect of prism sheet 360 and the effect of light adjustment member 380 of adjusting the amount of transmitted light, allowing brightness of the light emitting area (external surface of light-emitting planar member 330) to be made further uniform (smaller luminance unevenness). Furthermore, as illustrated in FIG. 20C (sectional view), in the surface light source device illustrated in FIG. 20B, specular reflection surface 312b may be formed in an area in the vicinity of light flux controlling member 100 of the internal surface of bottom plate 312.

Figure 20C:
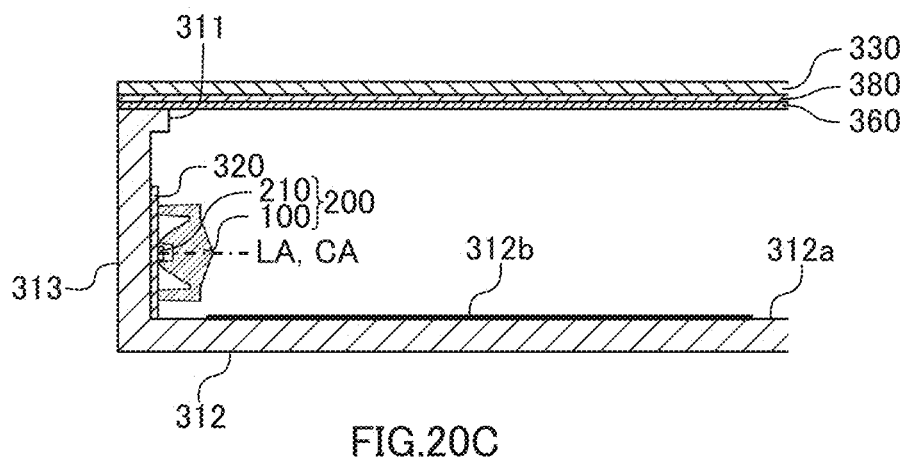
Figure 22A:
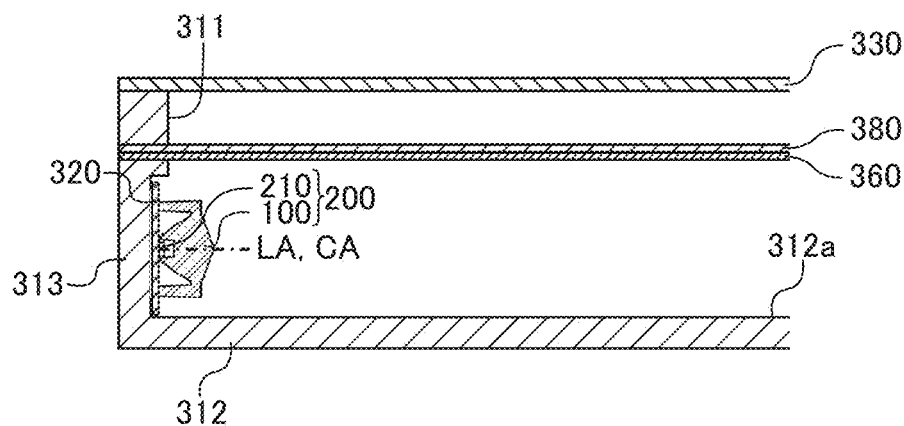
FIGS. 22A and 22B are drawings illustrating the configuration of other modifications of the surface light source device of the present invention.
Figure 22B:
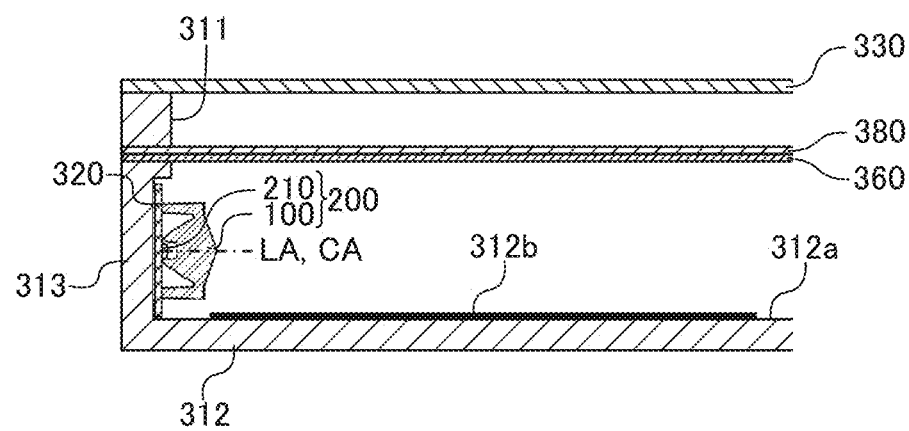

Further, as illustrated in FIGS. 22A and 22B (sectional views), in the surface light source devices of FIGS. 20B and 20C, light-emitting planar member 330 and light adjustment member 380 may be spaced apart from each other. The interval between light-emitting planar member 330 and light adjustment member 380 is not particularly limited, and may be adjusted taking account of the thickness of the surface light source device, or the like. Furthermore, in the surface light source devices of FIGS. 22A and 22B, the positions of light adjustment member 380 and prism sheet 360 may be exchanged (illustration omitted in both). Thus, by disposing light adjustment member 380 away from light-emitting planar member 330, it becomes possible to prevent the outer shape of through-holes 382 from being seen from the outside of light-emitting planar member 330.

Figure 23A:
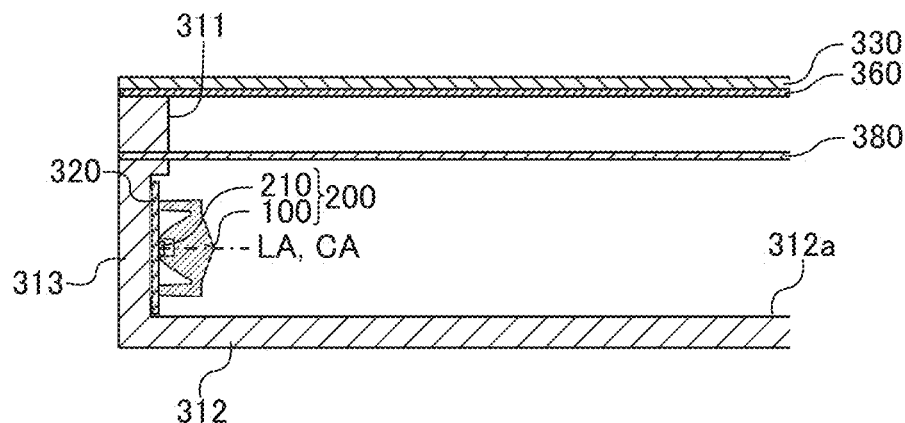
FIGS. 23A and 23B are drawings illustrating the configuration of other modifications of the surface light source device of the present invention.
Figure 23B:
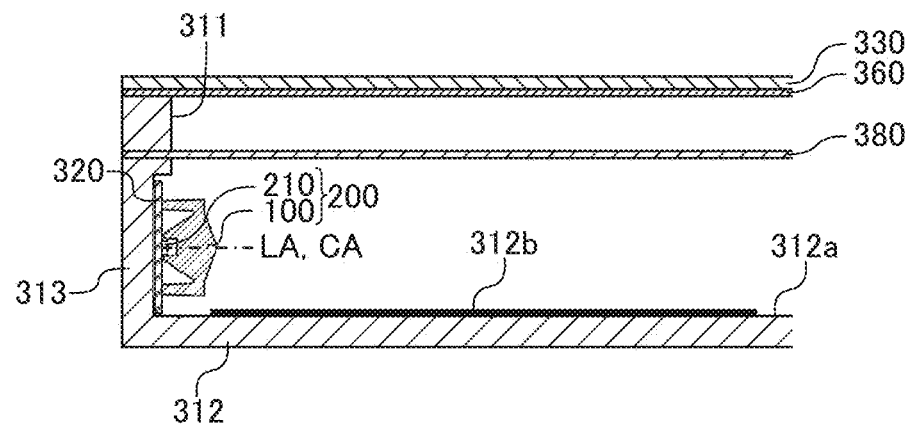

Further, as illustrated in FIG. 23A (sectional view), only light adjustment member 380 may be disposed on the lower stage, and prism sheet 360 may be disposed on the upper stage together with light-emitting planar member 330. In addition, as illustrated in FIG. 23B (sectional view), in the surface light source device illustrated in FIG. 23A, specular reflection surface 312b may be formed in an area in the vicinity of light flux controlling member 100 of the internal surface of bottom plate 312. Thus, by disposing light adjustment member 380 away from light-emitting planar member 330, it becomes possible to prevent the outer shape of through-holes 382 from being seen from the outside of light-emitting planar member 330. Furthermore, in the surface light source devices of FIGS. 23A and 22B, the positions of light adjustment member 380 and prism sheet 360 may be exchanged (illustration omitted in both).

Figure 24A:
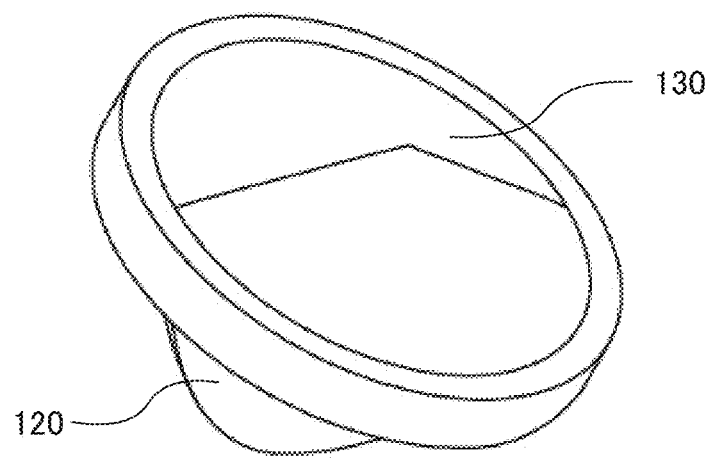
FIGS. 24A and 24B are perspective views of other embodiments of the light flux controlling member.
Figure 24B:
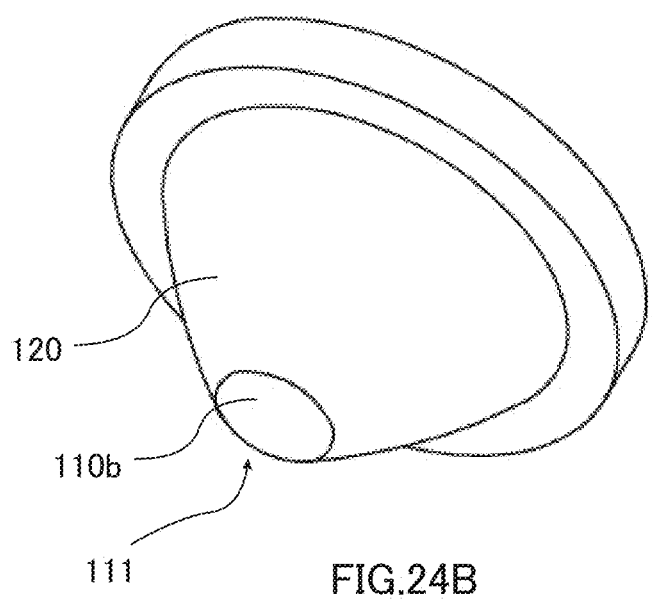

Furthermore, the shape of light flux controlling member 100 is not particularly limited, and it may have other forms. For example, as illustrated in FIGS. 24A and 24B, the light flux controlling member not having holder 160 may be used as a light flux controlling member.

The present application is entitled to and claims the benefits of Japanese Patent Application No. 2012-175008 filed on Aug. 7, 2012, and of Japanese Patent Application No. 2013-037144 filed on Feb. 27, 2013, the disclosure each of which including the specification, drawings and abstract is incorporated herein by reference in its entirety.

INDUSTRIAL APPLICABILITY

The surface light source device of the present invention is useful for example for a back light of a liquid crystal display apparatus, or a surface illumination apparatus.

REFERENCE SIGNS LIST 10, 300 Surface light source device
11 Unit case
12 LED light source unit
13 Condenser lens
14 Reflection member
15, 330 Light-emitting planar member
100 Light flux controlling member
110 Incidence surface
110a Internal top surface
110b Internal side surface
111 Recess
120 Total reflection surface
130 Emission surface
140 Flange
160 Holder
161, 162 Boss 200 Light emitting device
210 Light emitting element
310 Casing
311 Top plate
312 Bottom plate
312a Diffusion and reflection surface
312b Specular reflection surface
313 to 316 Sidewall
320 Substrate
340, 810, 820, 830, 910, 920 Reflection member
340a Ridge line
360 Prism sheet
380, 380a Light adjustment member
382 Through-hole
CA Central axis of light flux controlling member
LA Optical axis of light emitting element

The invention claimed is:

1. A surface light source device comprising:
a cavity surrounded by a bottom surface, side surfaces and a top surface, with a light emitting area being formed on the top surface;
a plurality of light emitting devices, each having a light emitting element and a light flux controlling member that controls a distribution of light emitted from the light emitting element, the plurality of light emitting devices being arranged on a pair of side surfaces facing each other inside the cavity such that an optical axis of the light emitting element extends from one of the pair of side surfaces to the other;
a reflection member that forms a part or all of the bottom surface; and
a light-emitting planar member that has a light diffusing property and optical transparency and forms the light emitting area, wherein:
the reflection member is protruded toward an inside of the cavity such that light emitted from the light emitting device is reflected toward the light emitting area, and has a ridge line that is parallel to the pair of side surfaces and the top surface, with an apex being formed with a curved surface including the ridge line;
when an emission angle, increasing from the optical axis to the light-emitting planar member side, relative to the optical axis of a light beam emitted from the light emitting device, is set as $\theta$,
a distance between a position where a light beam having been emitted from the light emitting device at emission angle $\theta$ and having been specularly reflected once at the reflection member reaches the light-emitting planar member and an end part closest to the light emitting device, of the light emitting area in the light-emitting planar member, is set as L1, and
an emission angle of a light beam, being emitted from the light emitting device to be tangential to the reflection member, relative to the optical axis is set as $\theta1$,
$\Delta L1 / \Delta \theta$ is gradually decreased in association with a decrease in the $\theta$ within a certain range whose upper limit is $\theta1$; and
when a distance between a position where a light beam having been emitted from the light emitting device at emission angle $\theta$ and having been specularly reflected once at each of the light-emitting planar member and the reflection member reaches the light-emitting planar member again and an end part closest to the light emitting device, of the light emitting area in the light-emitting planar member, is set as L2, and
an emission angle of a light beam, being emitted from the light emitting device to be reflected at the light-emitting planar member before reaching the ridge line of the reflection member, relative to the optical axis is set as $\theta2$,
$\Delta L2/\Delta \theta$ is gradually increased together with a decrease in L2 in association with an increase in the $\theta$ within a certain range including the $\theta2$.

2. The surface light source device according to claim 1, wherein a height of the ridge line from a base surface linking both lateral edge sides, at the bottom surface side, of the pair of side surfaces facing each other is higher than a height of the optical axis from the base surface.

3. The surface light source device according to claim 2, wherein a distance between a position where a light beam having been emitted from the light emitting device at emission angle $\theta1$ reaches the light-emitting planar member and an end part closest to the light emitting device, of the light emitting area in the light-emitting planar member, is greater than three-quarters of a dimension of the light emitting area in a direction between the pair of side surfaces.

4. The surface light source device according to claim 3, wherein the light flux controlling member includes:
a central axis;
an incidence surface that receives light emitted from the light emitting element, the incidence surface being disposed to face the side surface side and being formed so as to intersect the central axis;
a total reflection surface that reflects a part of light emitted from the incidence surface toward the reflection member side, the total reflection surface surrounding the central axis and being formed such that a diameter is gradually enlarged from the side surface side of a casing to the reflection member side; and
an emission surface that emits a part of light emitted from the incidence surface and light reflected at the total reflection surface toward the reflection member, the emission surface being disposed toward the ridge line side and being formed so as to intersect the central axis, and wherein
the light emitting element is disposed between the incidence surface and the side surface such that the central axis coincides with the optical axis.

5. A display apparatus comprising:
the surface light source device according to claim 4; and
a display member to be irradiated with light emitted from the light-emitting planar member of the surface light source device.

6. A display apparatus comprising:
the surface light source device according to claim 3; and
a display member to be irradiated with light emitted from the light-emitting planar member of the surface light source device.

7. The surface light source device according to claim 2, wherein the light flux controlling member includes:
a central axis;
an incidence surface that receives light emitted from the light emitting element, the incidence surface being disposed to face the side surface side and being formed so as to intersect the central axis;
a total reflection surface that reflects a part of light emitted from the incidence surface toward the reflection member side, the total reflection surface surrounding the central axis and being formed such that a diameter is gradually enlarged from the side surface side of a casing to the reflection member side; and
an emission surface that emits a part of light emitted from the incidence surface and light reflected at the total reflection surface toward the reflection member, the emission surface being disposed toward the ridge line side and being formed so as to intersect the central axis, and wherein the light emitting element is disposed between the incidence surface and the side surface such that the central axis coincides with the optical axis.

8. A display apparatus comprising:
the surface light source device according to claim 7; and
a display member to be irradiated with light emitted from the light-emitting planar member of the surface light source device.

9. A display apparatus comprising:
the surface light source device according to claim 2; and
a display member to be irradiated with light emitted from the light-emitting planar member of the surface light source device.

10. The surface light source device according to claim 1, wherein a distance between a position where a light beam having been emitted from the light emitting device at emission angle θ1 reaches the light-emitting planar member and an end part closest to the light emitting device, of the light emitting area in the light-emitting planar member, is greater than three-quarters of a dimension of the light emitting area in a direction between the pair of side surfaces.

11. The surface light source device according to claim 10, wherein the light flux controlling member includes:
a central axis;
an incidence surface that receives light emitted from the light emitting element, the incidence surface being disposed to face the side surface side and being formed so as to intersect the central axis;
a total reflection surface that reflects a part of light emitted from the incidence surface toward the reflection member side, the total reflection surface surrounding the central axis and being formed such that a diameter is gradually enlarged from the side surface side of a casing to the reflection member side; and
an emission surface that emits a part of light emitted from the incidence surface and light reflected at the total reflection surface toward the reflection member, the emission surface being disposed toward the ridge line side and being formed so as to intersect the central axis, and wherein
the light emitting element is disposed between the incidence surface and the side surface such that the central axis coincides with the optical axis.

12. A display apparatus comprising:
the surface light source device according to claim 11; and
a display member to be irradiated with light emitted from the light-emitting planar member of the surface light source device.

13. A display apparatus comprising:
the surface light source device according to claim 10; and
a display member to be irradiated with light emitted from the light-emitting planar member of the surface light source device.

14. The surface light source device according to claim 1, wherein the light flux controlling member includes:
a central axis;
an incidence surface that receives light emitted from the light emitting element, the incidence surface being disposed to face the side surface side and being formed so as to intersect the central axis;
a total reflection surface that reflects a part of light emitted from the incidence surface toward the reflection member side, the total reflection surface surrounding the central axis and being formed such that a diameter is gradually enlarged from the side surface side of a casing to the reflection member side; and
an emission surface that emits a part of light emitted from the incidence surface and light reflected at the total reflection surface toward the reflection member, the emission surface being disposed toward the ridge line side and being formed so as to intersect the central axis, and wherein
the light emitting element is disposed between the incidence surface and the side surface such that the central axis coincides with the optical axis.

15. A display apparatus comprising:
the surface light source device according to claim 14; and
a display member to be irradiated with light emitted from the light-emitting planar member of the surface light source device.

16. A display apparatus comprising:
the surface light source device according to claim 1; and
a display member to be irradiated with light emitted from the light-emitting planar member of the surface light source device.

* * * * *